US012028920B2

(12) United States Patent
Jung et al.

(10) Patent No.: US 12,028,920 B2
(45) Date of Patent: Jul. 2, 2024

(54) METHOD AND APPARATUS FOR BACKHAUL STATUS REPORTING IN WIRELESS COMMUNICATION SYSTEM

(71) Applicant: LG ELECTRONICS INC., Seoul (KR)

(72) Inventors: Sunghoon Jung, Seoul (KR); Gyeongcheol Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 347 days.

(21) Appl. No.: 17/594,831

(22) PCT Filed: May 4, 2020

(86) PCT No.: PCT/KR2020/005880

§ 371 (c)(1),
(2) Date: Oct. 29, 2021

(87) PCT Pub. No.: WO2020/222609

PCT Pub. Date: Nov. 5, 2020

(65) Prior Publication Data

US 2022/0217804 A1 Jul. 7, 2022

Related U.S. Application Data

(60) Provisional application No. 62/842,517, filed on May 2, 2019.

(51) Int. Cl.
*H04W 76/18* (2018.01)
*H04W 28/02* (2009.01)

(52) U.S. Cl.
CPC ....... *H04W 76/18* (2018.02); *H04W 28/0268* (2013.01)

(58) Field of Classification Search
None
See application file for complete search history.

(56) References Cited

U.S. PATENT DOCUMENTS

2020/0107383 A1* 4/2020 Novlan ................ H04W 76/15
2021/0219368 A1* 7/2021 Fujishiro .............. H04W 76/19

OTHER PUBLICATIONS

PCT International Application No. PCT/KR2020/005880, International Search Report dated Aug. 6, 2020, 1 pages.
Zte et al., “Discussion on IAB BH RLF handling,” 3GPP TSG RAN WG2 Meeting #105, R2-1900571, Feb.-Mar. 2019, 6 pages.
LG Electronics, “Criteria for southbound and northbound backhaul link failure,” 3GPP TSG-RAN WG2 Meeting #105, R2-1905027, Apr. 2019, 3 pages.

(Continued)

*Primary Examiner* — Hong Shao
(74) *Attorney, Agent, or Firm* — LEE, HONG, DEGERMAN, KANG & WAIMEY

(57) ABSTRACT

The present disclosure relates to backhaul status reporting in wireless communications. According to an embodiment of the present disclosure, a method performed by a network node in a wireless communication system comprises: monitoring backhaul links for multiple cell groups; receiving information indicating at least one cell group of which a backhaul status is to be reported among the multiple cell groups; and transmitting a message for reporting the backhaul status of the at least one cell group based on the information.

14 Claims, 22 Drawing Sheets

(56) References Cited

OTHER PUBLICATIONS

Nokia et al., “Backhaul link RLF handling,” 3GPP TSG-RAN WG2 Meeting #105, R2-1900627, Mar. 2019, 3 pages.
Samsung, “RLF handling in dual connection for intermediate IAB node,” 3GPP TSG RAN WG2 Meeting #105bis, R2-1905153, Apr. 2019, 2 pages.
Zte et al., “Procedures for backhaul link failure and recovery,” 3GPP TSG RAN WG3 Meeting #102, R3-186421, Nov. 2018, 9 pages.

* cited by examiner

METHOD AND APPARATUS FOR BACKHAUL STATUS REPORTING IN WIRELESS COMMUNICATION SYSTEM

CROSS-REFERENCE TO RELATED APPLICATIONS

This application is the National Stage filing under 35 U.S.C. 371 of International Application No. PCT/KR2020/005880, filed on May 4, 2020, which claims the benefit of U.S. Provisional Application No. 62/842,517, filed on May 2, 2019, the contents of which are all incorporated by reference herein in their entirety.

BACKGROUND OF THE DISCLOSURE

Field of the Disclosure

The present disclosure relates to backhaul status reporting in wireless communications.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In IAB networks, since backhaul links between the RAN nodes may be wireless, some issues that may occur in access link may also occur in the wireless backhaul links. For example, a quality of backhaul link may be degraded, or even a failure of the backhaul link may occur like a radio link failure (RLF). An IAB node associated with the backhaul link may detect and monitor such degradation, and in some situations it is required for the IAB node to report a backhaul status of the backhaul link.

SUMMARY OF THE DISCLOSURE

Technical Problem

An aspect of the present disclosure is to provide method and apparatus for backhaul status reporting in a wireless communication system.

Another aspect of the present disclosure is to provide method and apparatus for reporting a failure of a backhaul link in a wireless communication system.

Another aspect of the present disclosure is to provide method and apparatus for reporting a failure of a backhaul link when a network node is configured with multiple cell groups in a wireless communication system.

Technical Solution

According to an embodiment of the present disclosure, a method performed by a network node in a wireless communication system comprises: monitoring backhaul links for multiple cell groups; receiving information indicating at least one cell group of which a backhaul status is to be reported among the multiple cell groups; and transmitting a message for reporting the backhaul status of the at least one cell group based on the information.

According to an embodiment of the present disclosure, a network node in a wireless communication system comprising: a transceiver; a memory; and at least one processor operatively coupled to the transceiver and the memory, and configured to: monitor backhaul links for multiple cell groups, control the transceiver to receive information indicating at least one cell group of which a backhaul status is to be reported among the multiple cell groups, and control the transceiver to transmit a message for reporting the backhaul status of the at least one cell group based on the information.

According to an embodiment of the present disclosure, a processor for a network node in a wireless communication system is configured to control the network node to perform operations comprising: monitoring backhaul links for multiple cell groups; receiving information indicating at least one cell group of which a backhaul status is to be reported among the multiple cell groups; and transmitting a message for reporting the backhaul status of the at least one cell group based on the information.

Advantageous Effect

The present disclosure can have various advantageous effects.

For example, various embodiments of the present disclosure provide solution to allow a fine control on backhaul link status notification of each node.

For example, the failure notification can be controlled based on cell group being failed, the cause of the failure, and/or the failure recovery capability. Through this control capability, the stability of IAB node can be increased since unnecessarily backhaul link status notification can be avoided.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
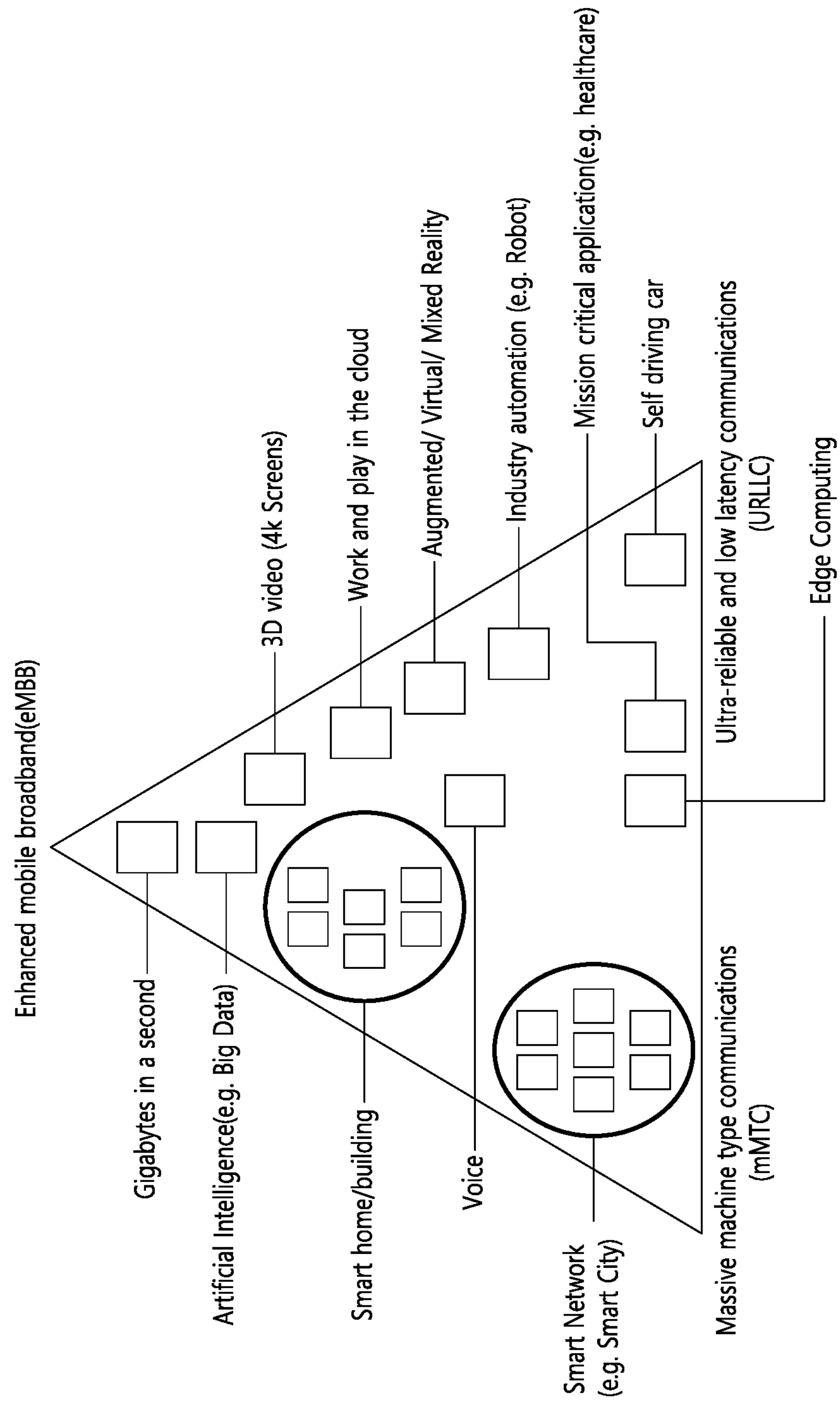
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as the followings:

"Integrated access and backhaul (IAB)" refers to a scheme in which a part of a wireless spectrum is used for backhaul connection of base stations instead of fiber (i.e., wireless backhaul). The IAB node may be a kind of a wireless device.

"IAB node" refers to a RAN node that supports wireless access to user equipments (UE)s and wirelessly backhauls the access traffic. The IAB node and the UE may be a kind of a wireless device.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Further, 'network node' in the disclosure may comprise a core network node, a RAN node such as an IAB node, and/or a wireless device.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
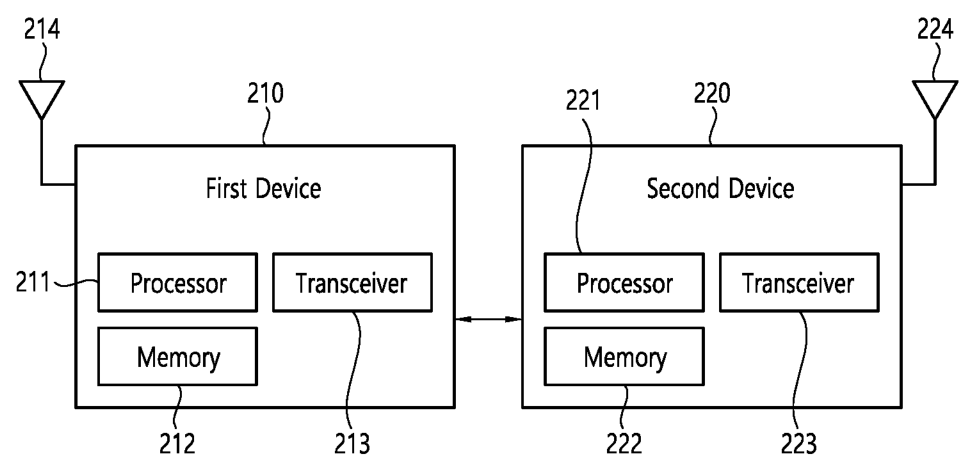
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
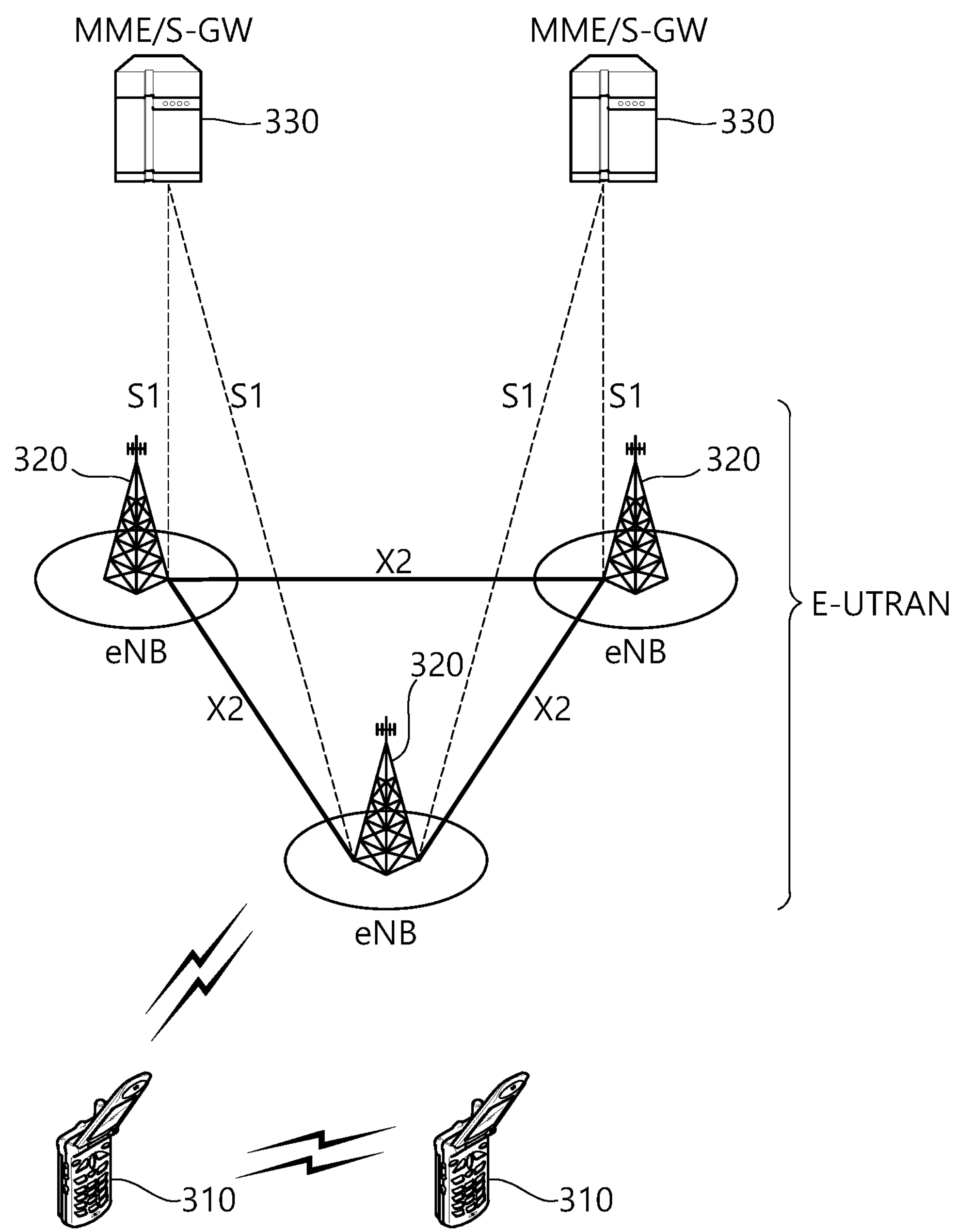
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
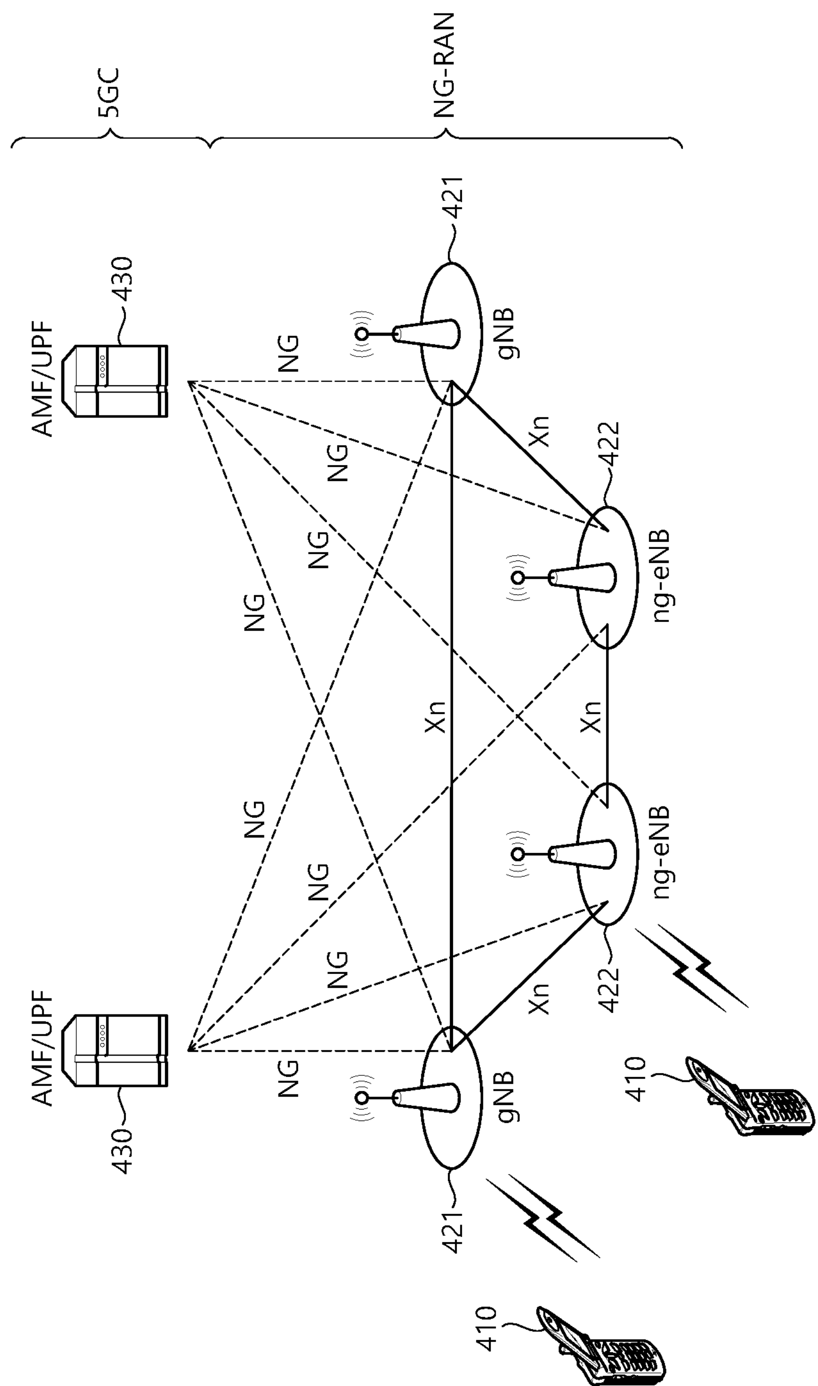
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
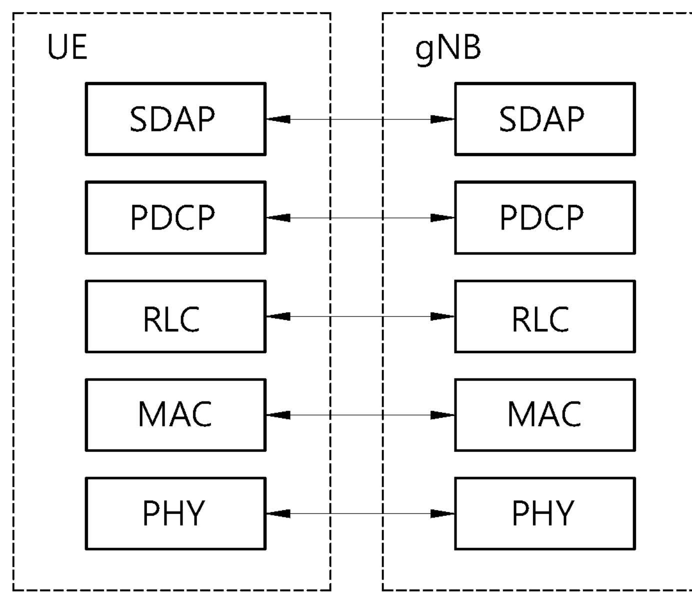
FIG. 5 shows a block diagram of a user plane protocol stack to which the technical features of the present disclosure can be applied.
Figure 6:
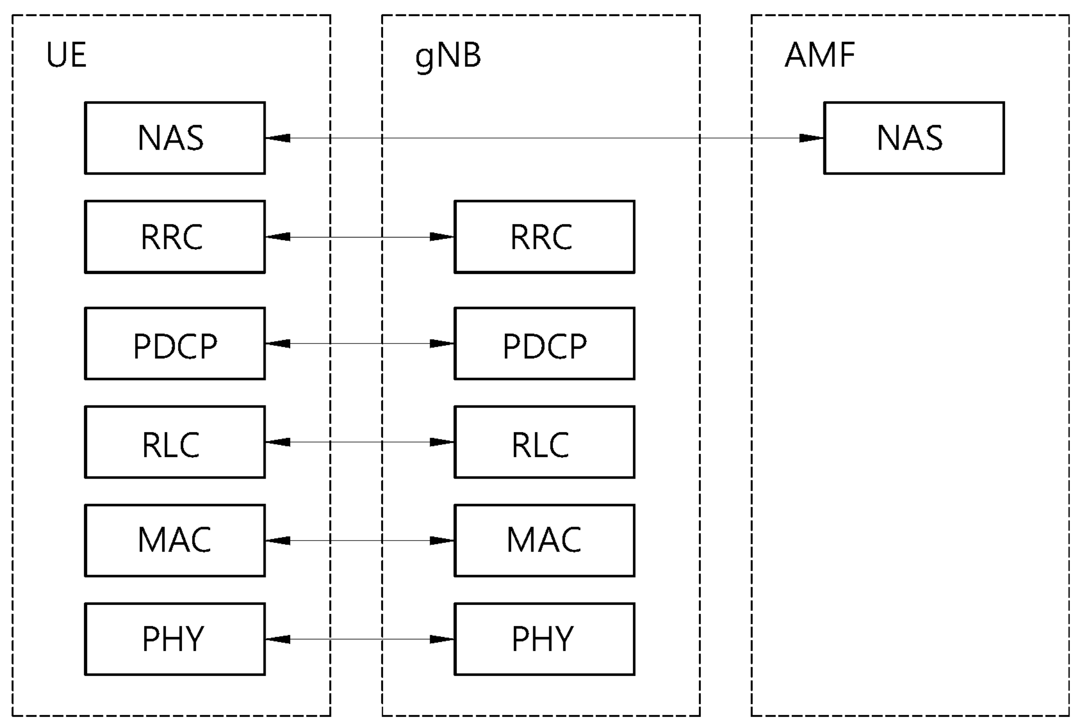
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
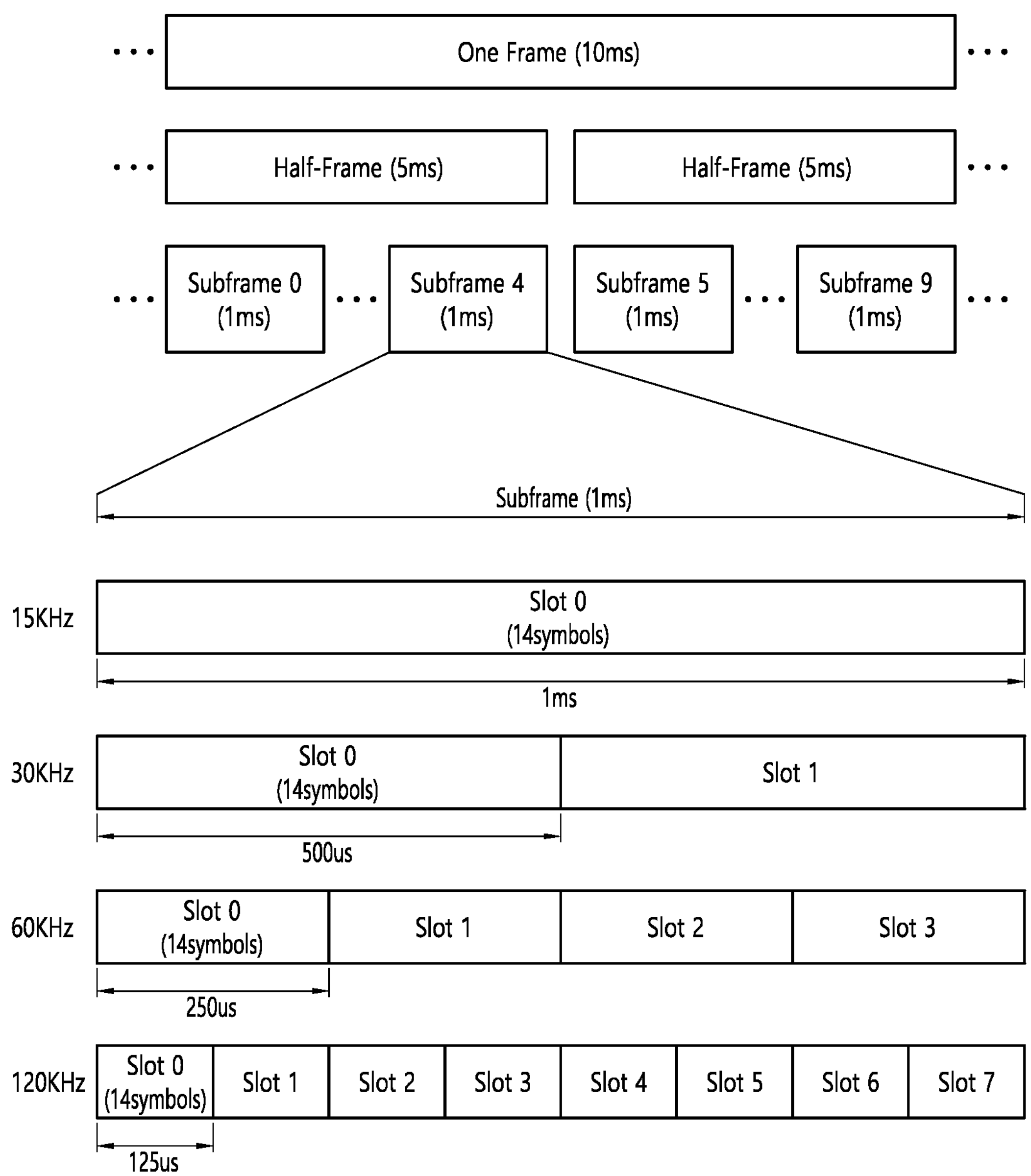
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing Δf=2u*15 kHz. The following table shows the number of OFDM symbols per slot, the number of slots per frame, and the number of slots per for the normal CP, according to the subcarrier spacing Δf=2u*15 kHz.

TABLE 3

| u | Nslotsymb | Nframe, uslot | Nsubframe, uslot |
|---|---|---|---|
| 0 | 14 | 10 | 1 |
| 1 | 14 | 20 | 2 |
| 2 | 14 | 40 | 4 |

TABLE 3-continued

| u | Nslotsymb | Nframe, uslot | Nsubframe, uslot |
|---|---|---|---|
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing Δf=2u*15 kHz.

TABLE 4

| u | Nslotsymb | Nframe, uslot | Nsubframe, uslot |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of Nsize,ugrid, x*NRBsc subcarriers and Nsubframe,usymb OFDM symbols is defined, starting at common resource block (CRB) Nstart,ugrid indicated by higher-layer signaling (e.g. radio resource control (RRC) signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize,ugrid for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i−1, where i is the number of the bandwidth part. The relation between the physical resource block nPRB in the bandwidth part i and the common resource block nCRB is as follows: nPRB=nCRB+NsizeBWP,i, where NsizeBWP,i is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
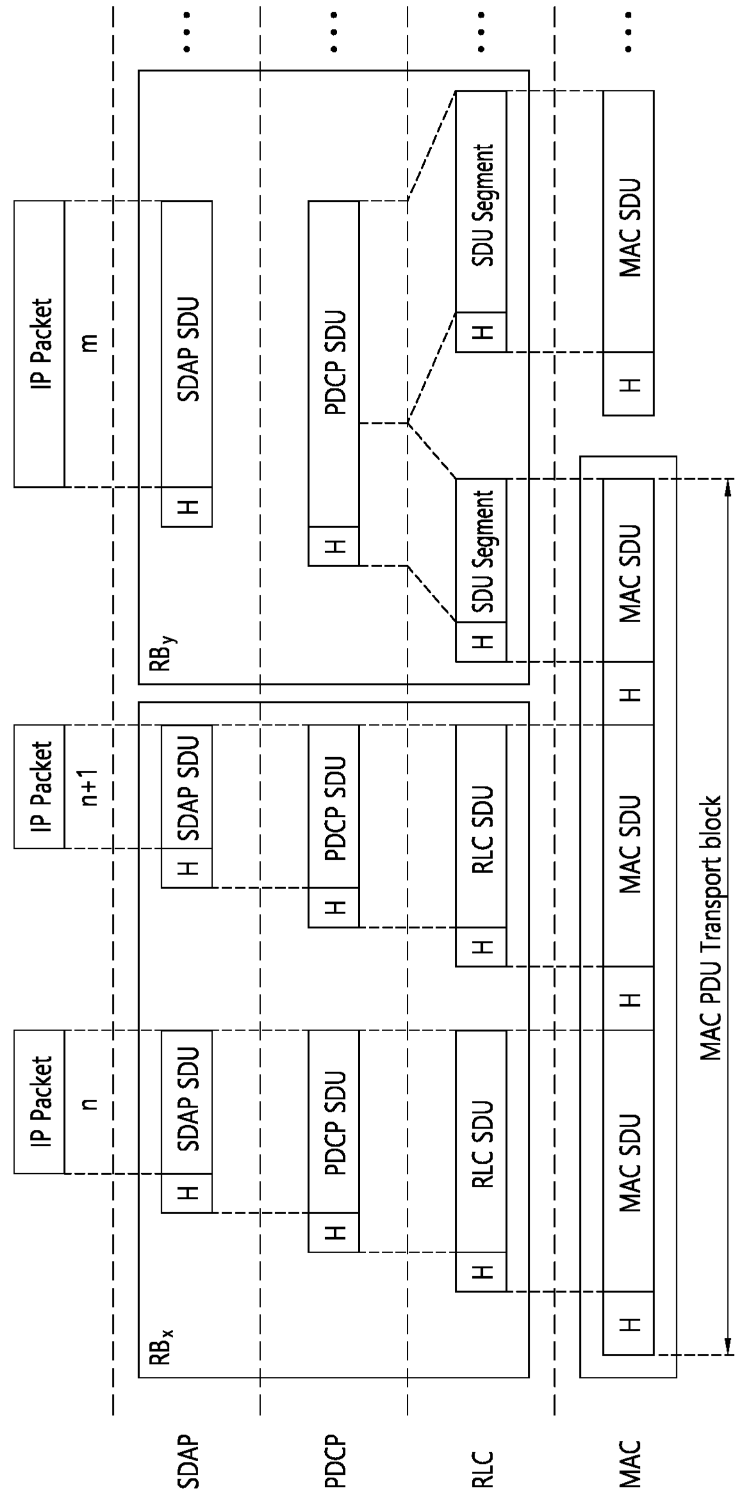
FIG. 8 illustrates a data flow example in the 3GPP NR system.

FIG. 8 illustrates a data flow example in the 3GPP NR system.

In FIG. 8, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Data unit(s) (e.g. PDCP SDU, PDCP PDU, RLC SDU, RLC PDU, RLC SDU, MAC SDU, MAC CE, MAC PDU) in the present disclosure is(are) transmitted/received on a physical channel (e.g. PDSCH, PUSCH) based on resource allocation (e.g. UL grant, DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

Figure 9:
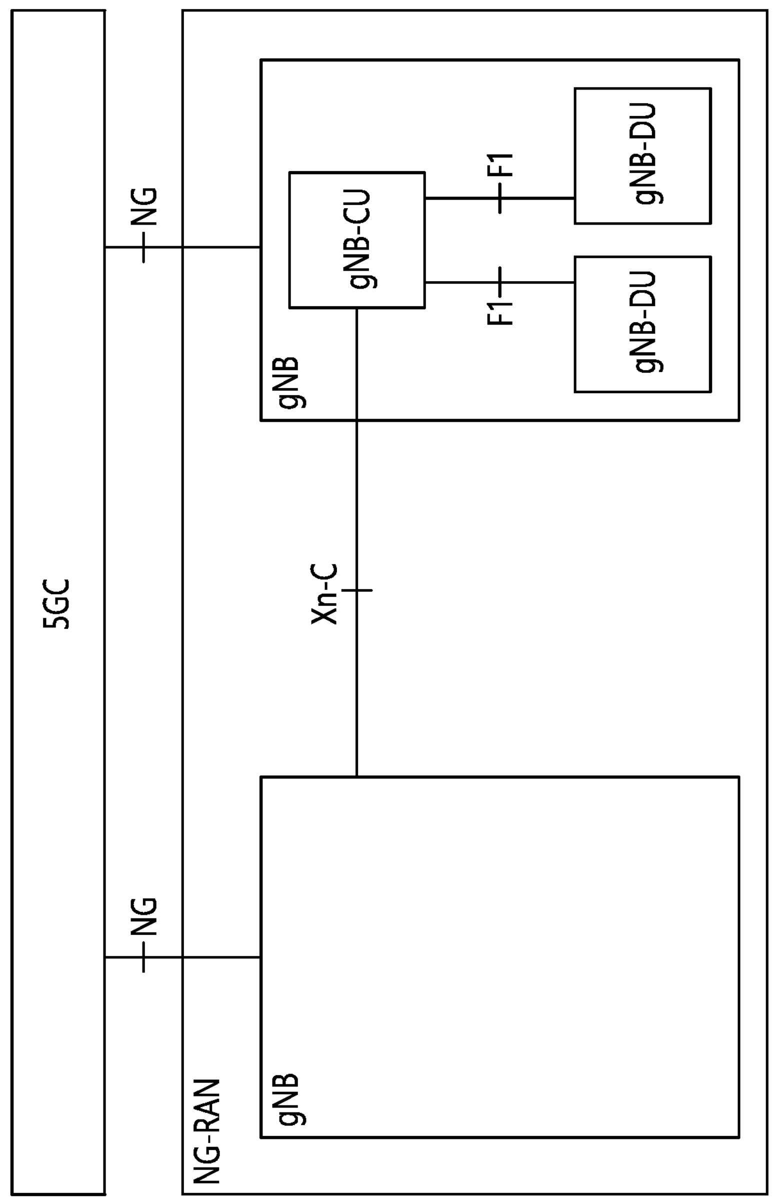
FIG. 9 shows an example of the overall architecture of an NG-RAN to which technical features of the present disclosure can be applied.

FIG. 9 shows an example of the overall architecture of an NG-RAN to which technical features of the present disclosure can be applied.

Referring to FIG. 9, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU.

The mapping between QoS flows and radio bearers is performed by gNB-CU and the granularity of bearer related management over F1 is radio bearer level. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

Figure 10:
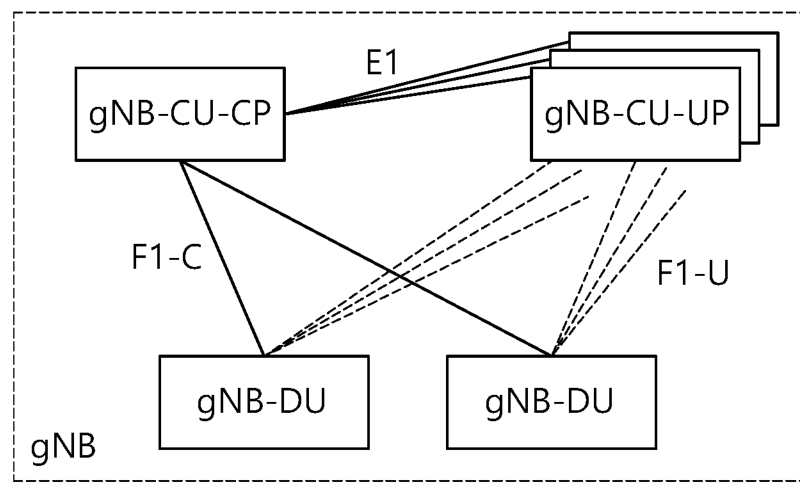
FIG. 10 shows an example of overall architecture for separation of gNB-CU-control plane (gNB-CU-CP) and gNB-CU-user plane (gNB-CU-UP) to which technical features of the present disclosure can be applied.

FIG. 10 shows an example of overall architecture for separation of gNB-CU-control plane (gNB-CU-CP) and gNB-CU-user plane (gNB-CU-UP) to which technical features of the present disclosure can be applied.

Referring to FIG. 10, a gNB may include a gNB-CU-CP, multiple gNB-CU-UPs and multiple gNB-DUs. A gNB-CU-CP may be simply referred to as CU-CP and a gNB-CU-UP may be simply referred to as CU-UP. The gNB-CU-CP and the gNB-CU-UP may be included in gNB-CU.

The gNB-CU-CP may be a logical node hosting an RRC and a control plane part of a PDCP protocol of the gNB-CU for a gNB. As illustrated, the gNB-CU-CP is connected to the gNB-DU through F1-C interface. The gNB-CU-CP terminates an E1 interface connected with the gNB-CU-UP and the F1-C interface connected with the gNB-DU.

The gNB-CU-UP may be a logical node hosting a user plane part of the PDCP protocol of the gNB-CU for a gNB, and the user plane part of the PDCP protocol and a SDAP protocol of the gNB-CU for a gNB. As illustrated, the gNB-CU-UP is connected to the gNB-DU through F1-U interface, and is connected to the gNB-CU-CP through the E1 interface. The gNB-CU-UP terminates the E1 interface connected with the gNB-Cu-CP and the F1-U interface connected with the gNB-DU.

According to an illustration shown in FIG. 10, the following properties may hold:

(1) A gNB-DU may be connected to a gNB-CU-CP.

(2) A gNB-CU-UP may be connected to a gNB-CU-CP.

(3) A gNB-DU can be connected to multiple gNB-CU-UPs under the control of the same gNB-CU-CP (i.e., the gNB-CU-CP to which the gNB-DU is connected and the multiple gNB-CU-UPs are connected).

(4) A gNB-CU-UP can be connected to multiple DUs under the control of the same gNB-CU-CP (i.e., the gNB-CU-CP to which the gNB-CU-UP is connected and the multiple DUs are connected).

Figure 11:
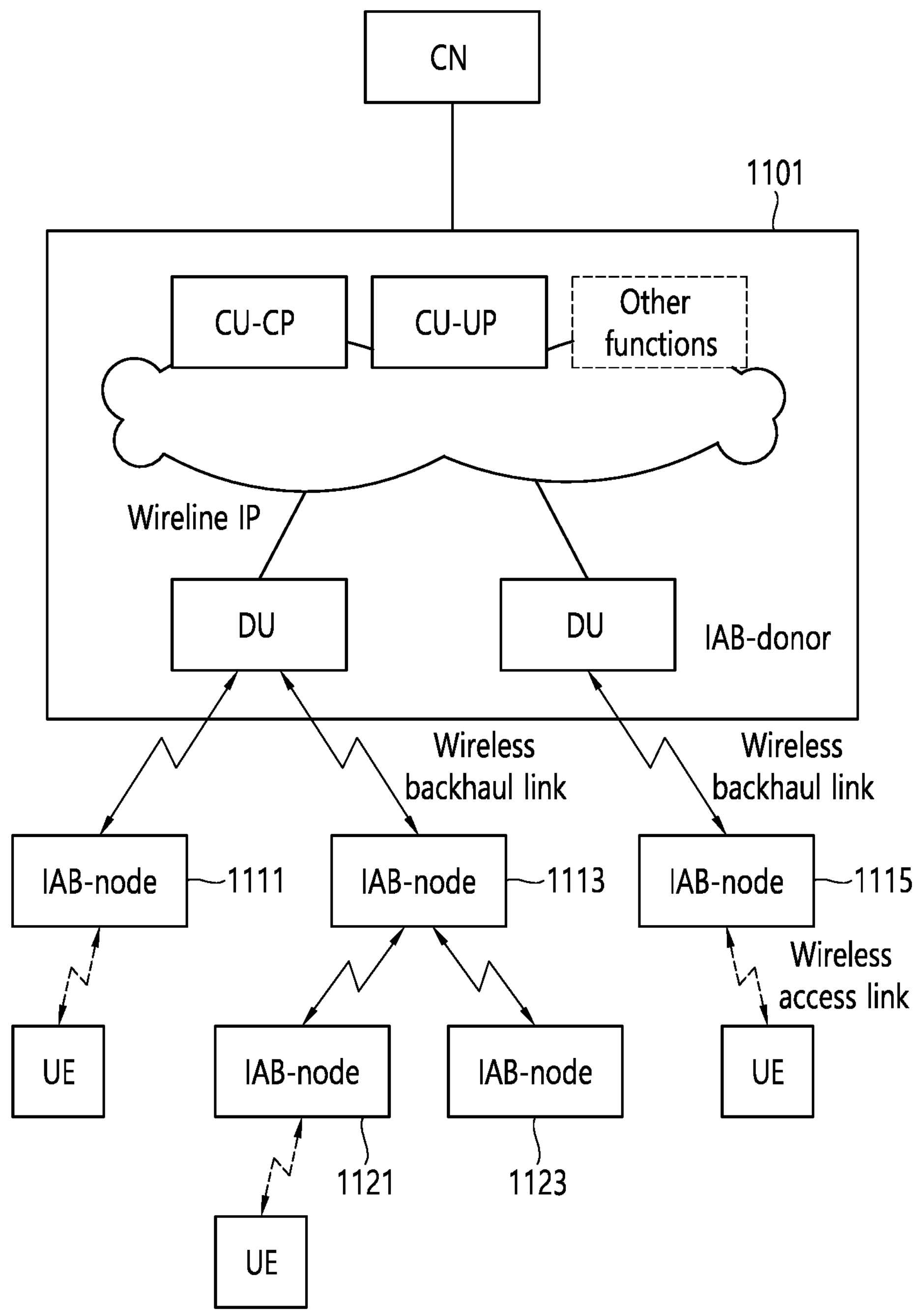
FIG. 11 shows an example of IAB topology to which technical features of the present disclosure can be applied.

FIG. 11 shows an example of IAB topology to which technical features of the present disclosure can be applied.

Referring to FIG. 11, the IAB topology may comprise an IAB donor 1101 and multiple IAB nodes 1111, 1113, 1115, 1121 and 1123. "IAB donor node (or, simply IAB donor)" refers to a RAN node which provides UE's interface to core network (CN) and wireless backhauling functionalities to IAB nodes. The IAB donor 1101 may be treated as a signal logical node that may comprise a set of functions such as DU, CU-CP, CU-UP and potentially other functions. In a deployment, the IAB donor can be split according to these functions, which can all be either collocated or non-collocated. Also, some of the functions presently associated with the IAB donor may eventually be moved outside of the IAB donor in case it becomes evident that the functions do not perform IAB-specific tasks.

The IAB donor 1101 may be connected to the IAB node 1111, 1113 and 1115 via wireless backhaul link, and may communicate with the IAB node 1111, 1113 and/or 1115 via the wireless backhaul link. For example, DUs of the IAB donor 1101 may be used to communicate with the IAB nodes 1111, 1113 and/or 1115 via wireless backhaul link. Each of the IAB node 1111 and 1115 may communicate with a UE served by itself via wireless access link. Further, the IAB donor 1101 may be a parent node for the IAB node 1111, 1113 and 1115, and the IAB node 1111, 1113 and 1115 may be a child node for the IAB donor 1101. The definition of the parent node and the child node will be described later.

The IAB node 1113 may be connected to IAB node 1121 and 1123 via wireless backhaul link, and may communicate with the IAB node 1121 and/or 1123 via wireless backhaul link. The IAB node 1121 may communicate with a UE served by itself via wireless access link. Further, the IAB node 1113 may be a parent node for the IAB node 1121 and 1123, and the IAB node 1121 and 1123 may be a child node for the IAB node 1113.

The IAB nodes 1111, 1113 and 1115 may directly communicate with IAB donor 1101 via wireless backhaul link. Therefore, the distance between the IAB donor 1101 and each of the IAB nodes 1111, 1113 and 1115 may be expressed as 1-hop distance. The IAB donor 1101 may be 1-hop parent node for the IAB nodes 1111, 1113 and 1115, and the IAB nodes 1111, 1113 and 1115 may be 1-hop child node for the IAB donor 1101.

The IAB nodes 1121 and 1123 may communicate with the IAB donor 1101 via a first wireless backhaul link and a second wireless backhaul link. The first wireless backhaul link may be a wireless backhaul link between i) the IAB node 1113 ii) the IAB nodes 1121 and/or 1123. The second wireless backhaul link may be a wireless backhaul link between the IAB node 1113 and the IAB donor 1101. Therefore, the distance between the IAB donor 1101 and each of the IAB nodes 1121 and 1123 may be expressed as 2-hop distance. The IAB donor 1101 may be 2-hop parent node for the IAB nodes 1121 and 1123, and the IAB nodes 1121 and 1123 may be 2-hop child node for the IAB donor 1101. In a similar way, N-hop distance may be defined between arbitrary IAB nodes (including or not including IAB donor), and thus, N-hop parent node and N-hop child node may also be defined.

Figure 12:
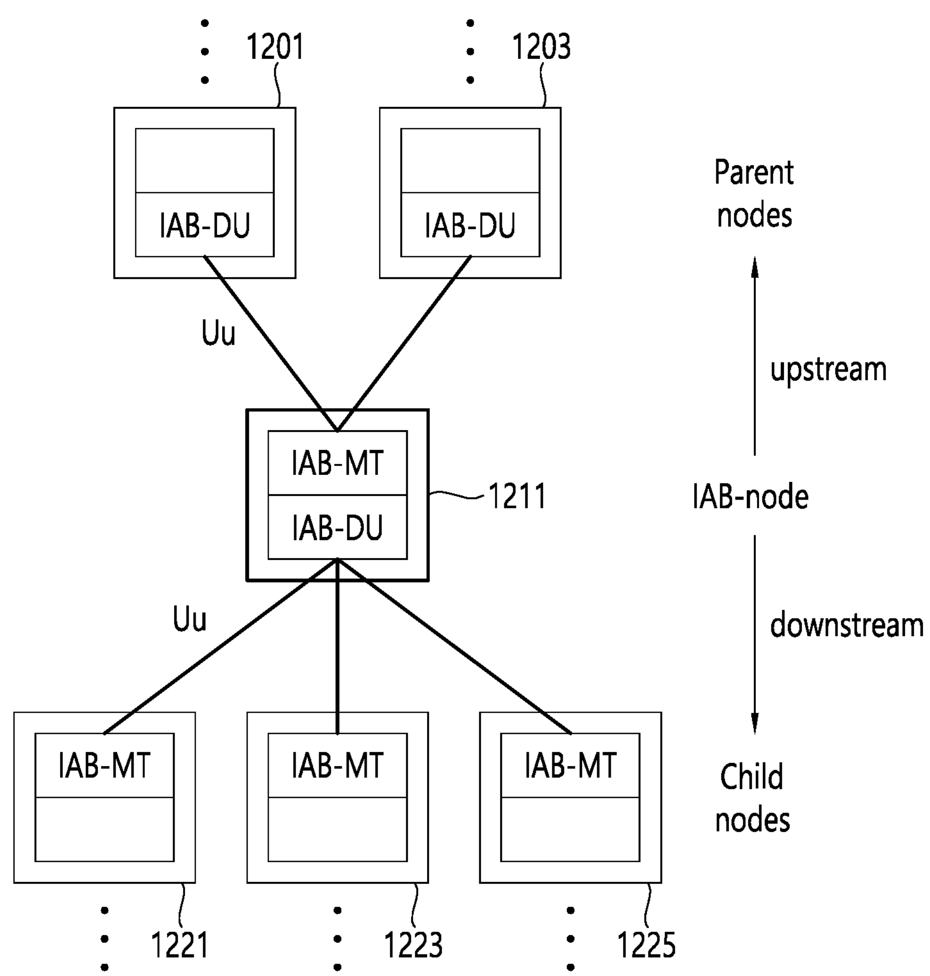
FIG. 12 shows a parent and child node relationship for IAB node to which technical features of the present disclosure can be applied.

FIG. 12 shows a parent and child node relationship for IAB node to which technical features of the present disclosure can be applied.

Referring to FIG. 12, an IAB node 1211 may be connected to parent nodes 1201 and 1203 via wireless backhaul links, and may be connected to child nodes 1221, 1223 and 1225 via wireless backhaul links. Throughout the disclosure, "parent IAB node (or, simply parent node)" for an IAB node may be defined as a next hop neighbor node with respect to an IAB-mobile termination (IAB-MT, or simply MT) of the IAB node. That is, the neighbor node on the IAB-MT's interface may be referred to as a parent node. The parent node can be IAB node or IAB donor-DU. Further, "child IAB node (or, simply child node)" for an IAB node may be defined as a next hop neighbor node with respect to an IAB-DU (or, simply DU) of the IAB node. That is, the neighbor node on the IAB-DU's interface may be referred to as a child node.

IAB-MT may refer to an IAB node function that terminates the Uu interface to the parent node. IAB-DU may refer to a gNB-DU functionality supported by the IAB node to terminate the access interface to UEs and next-hop IAB nodes, and/or to terminate the F1 protocol to the gNB-CU functionality on the IAB donor.

The direction toward the child node may be referred to as downstream while the direction toward the parent node may be referred to as upstream. Further, a backhaul link between an IAB node and a parent node for the IAB node may be referred to as upward backhaul link for the IAB node. A backhaul link between an IAB node and a child node for the IAB node may be referred to as downward backhaul link for the IAB node. A backhaul link for an IAB node may comprise at least one of an upward backhaul link for the IAB node, or a downward backhaul link for the IAB node.

Figure 13:
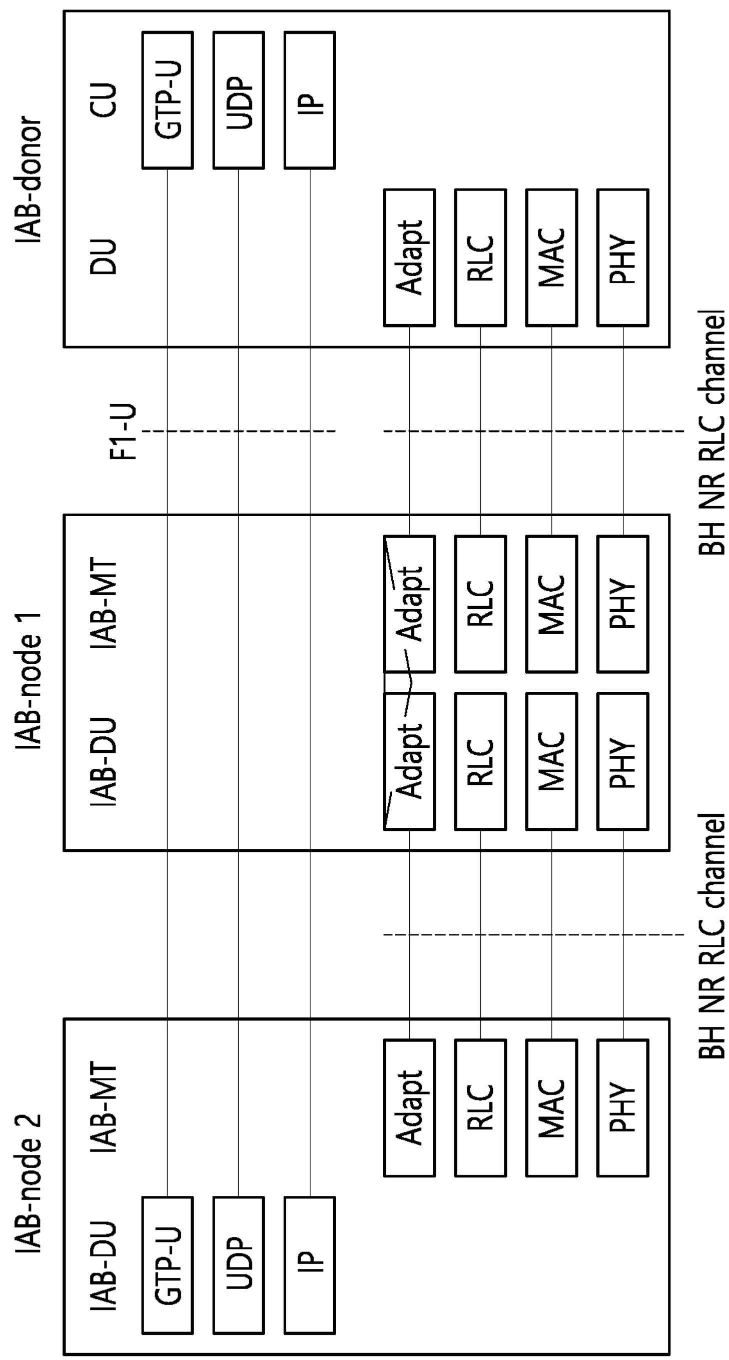
FIG. 13 shows an example of a protocol stack for F1-U protocol between IAB-DU and IAB donor-CU to which technical features of the present disclosure can be applied.
Figure 14:
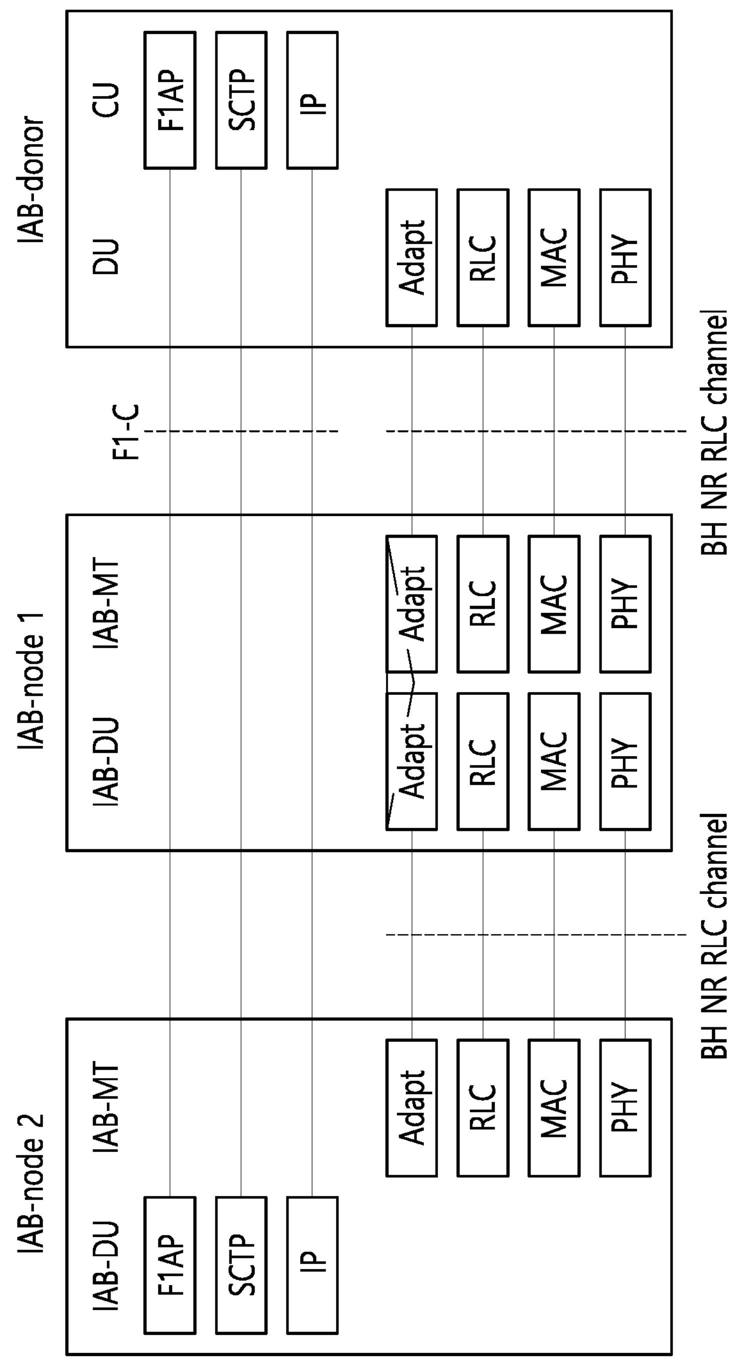
FIG. 14 shows an example of a protocol stack for F1-C protocol between IAB-DU and IAB donor-CU to which technical features of the present disclosure can be applied.

FIG. 13 shows an example of a protocol stack for F1-U protocol between IAB-DU and IAB donor-CU to which technical features of the present disclosure can be applied. FIG. 14 shows an example of a protocol stack for F1-C protocol between IAB-DU and IAB donor-CU to which technical features of the present disclosure can be applied. In FIGS. 13-14, it is exemplary assumed that F1-U and F1-C are carried over 2 backhaul hops.

Referring to FIGS. 13-14, each of the IAB donor, IAB node 1 and IAB node 2 may comprise an adaptation layer (or, adaptation entity, adapt layer/entity). On the wireless backhaul, the IP layer may be carried over the adaptation layer, which may enable routing over multiple hops. The IP layer may be also used for some non-F1 traffic, such as signalling traffic for the establishment and management of SCTP associations and the F1-supporting security layer.

On each backhaul link, the adapt PDUs may be carried by backhaul (BH) RLC channels. Multiple BH RLC channels can be configured on each BH link to allow traffic prioritization and QoS enforcement. The BH-RLC-channel mapping for adapt PDUs may be performed by the adapt entity on each IAB-node and the IAB-donor.

Throughout the disclosure, the adaptation layer may be also referred to as a backhaul adaptation protocol (BAP) layer.

Figure 15:
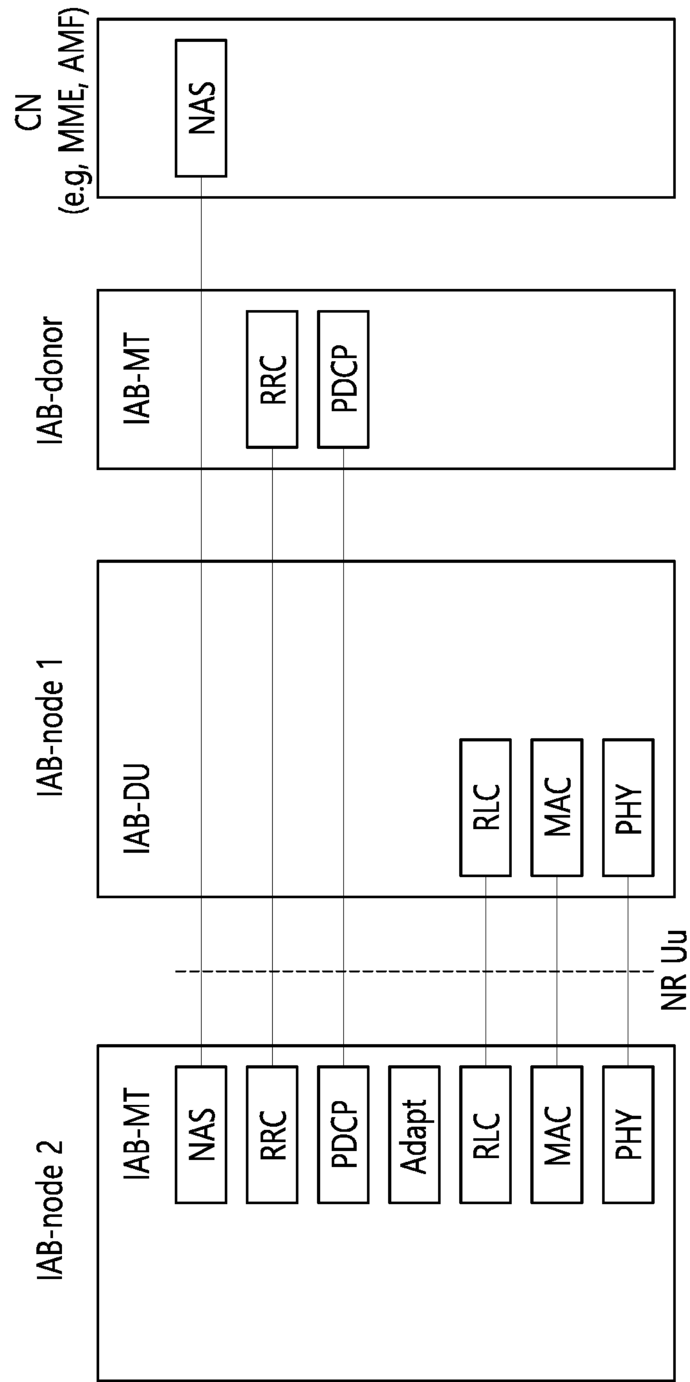
FIG. 15 shows an example of a protocol stack for IAB-MT's RRC and NAS connections.

FIG. 15 shows an example of a protocol stack for IAB-MT's RRC and NAS connections.

Referring to FIG. 15, protocol stacks for SRB and/or DRB are shown. The IAB-MT may establish SRBs carrying RRC and NAS and potentially DRBs (e.g. carrying OAM traffic) with the IAB-donor. These SRBs and DRBs may be transported between the IAB-MT of an IAB node and a parent node for the IAB node over Uu access channel(s).

As shown in FIG. 15, NAS/RRC/PDCP layer may be upper layers for adaptation layer, and RLC/MAC/PHY layer may be lower layers for the adaptation layer. In other words, the adaptation layer may lie between the RRC layer and the PDCP layer. Although not shown in FIG. 15, as well as the IAB-MT, the IAB-DU may also comprise the adaptation layer that lies between the RRC layer and the PDCP layer.

Hereinafter, details of the adaptation layer are described.

The UE may establish RLC channels to the DU on the UE's access IAB-node. Each of these RLC-channels may be extended via a potentially modified form of F1-U, referred to as F1*-U, between the UE's access DU and the IAB-donor.

The information embedded in F1*-U may be carried over RLC-channels across the backhaul links. Transport of F1*-U over the wireless backhaul may be enabled by an adaptation layer, which is integrated with the RLC channel.

Within the IAB-donor (may be referred to as fronthaul), the baseline may be to use native F1-U stack. The IAB-donor DU may relay between F1-U on the fronthaul and F1*-U on the wireless backhaul.

For example, information carried on the adaptation layer may support the following functions:

- Identification of the UE-bearer for the PDU;
- Routing across the wireless backhaul topology;
- QoS-enforcement by the scheduler on DL and UL on the wireless backhaul link;
- Mapping of UE user-plane PDUs to backhaul RLC channels; and/or
- Potentially other functions.

For another example, information carried on the adaptation layer may support the following functions:

- Routing across the wireless backhaul topology;
- QoS-enforcement by the scheduler on DL and UL on the wireless backhaul link;
- Mapping of UE user-plane PDUs to backhaul RLC channels; and/or
- Potentially other functions.

In case the IAB-node is connected via multiple paths, different identifiers (e.g. route ID, IAB-node address) in the adaptation layer will be associated with the different paths, enabling adaptation layer routing on the different paths. The different paths can be associated with different backhaul RLC-channels.

For example, information to be carried on the adaptation layer header may include:

- UE-bearer-specific Id;
- UE-specific Id;
- Route Id, IAB-node or IAB-donor address;
- QoS information; and/or
- Potentially other information.

IAB-nodes will use the identifiers carried via Adapt to ensure required QoS treatment and to decide which hop a packet should be sent to.

The UE-bearer-specific Id may be used by the IAB-node and the IAB-donor to identify the PDU's UE-bearer. UE's access IAB-node would then map Adapt information (e.g. UE-specific ID, UE-bearer specific ID) into the corresponding C-RNTI and LCD. The IAB-donor DU may also need to map Adapt information into the F1-U GTP-U TEID used between Donor DU and Donor CU.

UE-bearer-specific Id, UE-specific Id, Route Id, or IAB-node/IAB-donor address may be used (in combination or individually) to route the PDU across the wireless backhaul topology.

UE-bearer-specific Id, UE-specific Id, UE's access node IAB ID, or QoS information may be used (in combination or individually) on each hop to identify the PDU's QoS treatment. The PDU's QoS treatment may also be based on the LCD.

For example, the adaptation layer may be integrated with MAC layer or placed above MAC layer. For another example, the adaptation layer may be above RLC layer.

For 1:1 mapping of UE-bearers to backhaul RLC-channels, adaptation layer can be integrated with the MAC layer or placed above the MAC layer. A separate RLC-entity in each IAB-node is provided for each of these backhaul RLC-channels. Arriving PDUs are mapped to the corresponding RLC-entity based on the UE-bearer information carried by adaptation layer.

When UE-bearers are aggregated to backhaul RLC-channels (e.g. based on QoS-profile), adaptation layer can be placed above the RLC layer.

For both adaptation layer above RLC and adaptation layer above MAC, when UE bearers are aggregated to logical channels, the logical channel can be associated to a QoS profile. The number of QoS-profiles supported may be limited by the LCID-space.

While RLC channels serving for backhauling include the adaptation layer, the adaptation layer may or may not be included in IAB-node access links.

The adaptation layer may comprise sublayers. It may be perceivable, for example, that the GTP-U header becomes a part of the adaptation layer. It may also be possible that the GTP-U header is carried on top of the adaptation layer to carry end-to-end association between the IAB-node DU and the CU.

Alternatively, an IP header may be part of the adaptation layer or carried on top of the adaptation layer. In this example, the IAB-donor DU may hold an IP routing function to extend the IP-routing plane of the fronthaul to the IP-layer carried by adaptation layer on the wireless backhaul. This may allow native F1-U to be established end-to-end, (i.e. between IAB-node DUs and IAB-donor CU-UP). The scenario may imply that each IAB-node may hold an IP-address, which may be routable from the fronthaul via the IAB-donor DU. The IAB-nodes' IP addresses may further be used for routing on the wireless backhaul.

The IP-layer on top of the adaptation layer may not represent a PDU session. The MT's first hop router on this IP-layer therefore may not have to hold a user plane function (UPF).

Observations on adaptation layer placement (i.e., above-RLC adaptation layer or above-MAC adaptation layer) may be as the followings:

1. The above-RLC adaptation layer can only support hop-by-hop ARQ. The above-MAC adaptation layer can support both hop-by-hop and end-to-end ARQ.
2. Both adaptation layer placements can support aggregated routing (e.g. by inserting an IAB-node address into the adaptation header).
3. UE-specific ID may be a completely new identifier or one of the existing identifiers can be reused. The identifier(s) included in adaptation layer may vary depending on the adaptation layer placement.
4. Both adaptation layer placements can support per-UE-bearer QoS treatment. In order for each UE bearer to receive individual QoS support when their number exceeds the size of the LCID space, one possible solution may be the extension of the LCD-space which can be achieved through changes to the MAC sub-header, or by dedicated information placed in the adaptation header. Enhancements to BSR reporting may be required.
5. Both adaptation layer placements can support aggregated QoS handling as in the following example network configurations:
   a. For above-RLC adaptation layer, UE-bearers with same QoS profile could be aggregated to one backhaul RLC-channel for this purpose;
   b. For above-MAC or integrated-with-MAC adaptation layer, UE-bearers with same QoS profile could be treated with same priority by the scheduler.
6. For both adaptation layer placements, aggregation of routing and QoS handling may allow proactive configuration of intermediate on-path IAB-nodes (i.e. configuration may be independent of UE-bearer establishment/release).
7. For both adaptation layer placements, RLC ARQ can be pre-processed on TX side.

Figure 16:
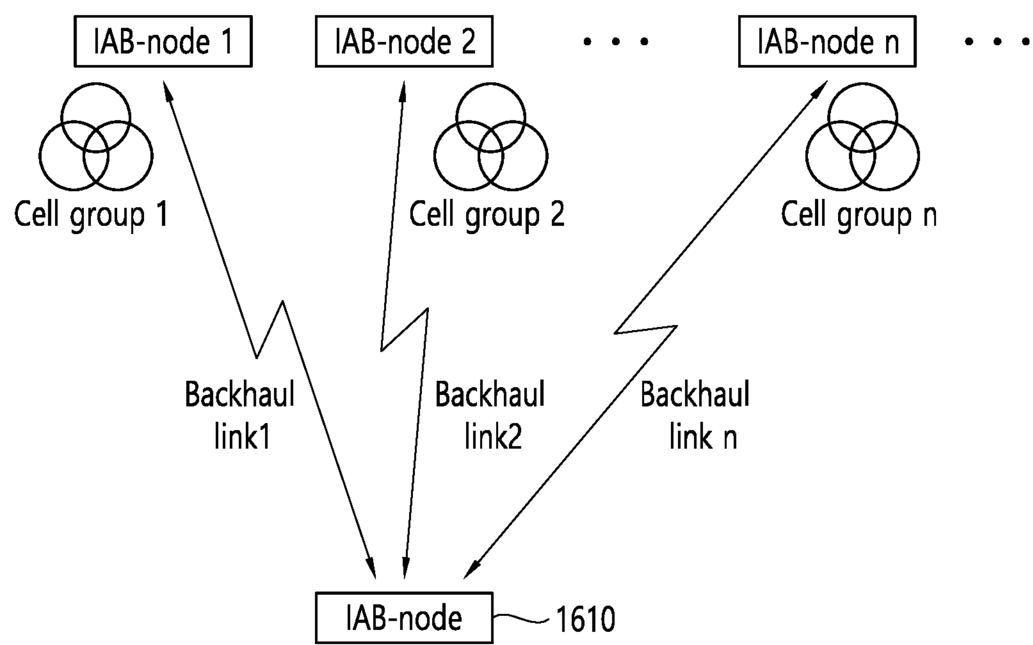
FIG. 16 shows an example of multiple cell groups in an IAB network to which technical features of the present disclosure can be applied.

FIG. 16 shows an example of multiple cell groups in an IAB network to which technical features of the present disclosure can be applied.

Referring to FIG. 16, IAB node 1610, and IAB nodes 1 to n are described. The IAB nodes 1 to n may be parent IAB nodes for the IAB node 1610 (1≤n≤N), where N is the number of the parent IAB nodes.

Between the IAB node 1610 and each of the parent IAB nodes, a backhaul link may be established. For example, backhaul link 1 may be established between the IAB node 1610 and the IAB node 1, backhaul link 2 may be established between the IAB node 1610 and the IAB node 2, backhaul link 3 may be established between the IAB node 1610 and the IAB node 3, and so on. The backhaul links 1 to n may be wireless backhaul links.

The IAB node 1610 may be configured with multiple cell groups (i.e., cell group 1 to n) to communicate with the parent IAB nodes via backhaul links. Each parent IAB node may be associated with a cell group. For example, IAB node 1 may be associated with a cell group 1, IAB node 2 may be associated with a cell group 2, IAB node n may be associated with a cell group n, and so on. Each cell group may refer to a group of serving cells for the IAB node 1610, and may comprise a primary cell (PCell) and optionally one or more secondary cells (SCells).

For example, among the multiple cell groups (i.e., cell groups 1 to n), one of the multiple cell groups may be a master cell group (MCG), and the other(s) of the multiple cell groups may be a secondary cell group (SCG). The MCG may comprise a PCell and optionally one or more SCells, and the SCG may comprise a primary secondary cell (PSCell) and optionally one or more SCells.

Since cell group 1 associated with IAB node 1 comprises serving cells for the IAB node 1610 and backhaul link 1 is established between the IAB node 1 and the IAB node 1610, the backhaul link 1 may be associated with/related to (or, may correspond to) the cell group 1. Similarly, since cell group n associated with IAB node n comprises serving cells for the IAB node 1610 and backhaul link n is established between the IAB node n and the IAB node 1610, the backhaul link n may be associated with/related to (or, may correspond to) the cell group n. That is, different backhaul links may correspond to different cell groups.

In various situations in IAB networks, a backhaul link for an IAB node may fail. For example, a failure of a backhaul link for an IAB node may occur if a radio quality degrades due to temporal appearance of blockage along the backhaul link, or the IAB node fails to comply with a configuration received from the IAB donor. For another example, a failure of a backhaul link for an IAB node may occur if a timer, which may start upon detecting a physical problem on the backhaul link and stop upon recovery of the physical layer problem on the backhaul link, expires. For another example, a failure of a backhaul link for an IAB node may occur if a random access problem on the backhaul link is indicated. For another example, a failure of a backhaul link for an IAB node may occur if the maximum number of retransmissions has been reached for the backhaul link. A failure of a backhaul link may be a kind of a radio link failure (RLF) on the backhaul link.

In a wireless communication system, an IAB node may be configured with/associated with one or multiple cell groups. In IAB network, a failure of a cell group may correspond to a failure of a backhaul/backhaul link associated with the cell group. The impact of the backhaul link failure then may propagate to downwards as well as upwards through IAB networks from the failure point (i.e., an IAB node for which a failure of a backhaul link occurred). If the IAB node immediately sends a failure notification for a backhaul link to other network nodes regardless of the cell group being failed, the cause of the failure, or the failure recovery capability, the IAB node may suffer from frequent topology change, re-routing, and QoS remapping, lowering stability of the IAB network. So, it is beneficial to fine-control in which case of backhaul failure the IAB node needs to send failure notification.

Figure 17:
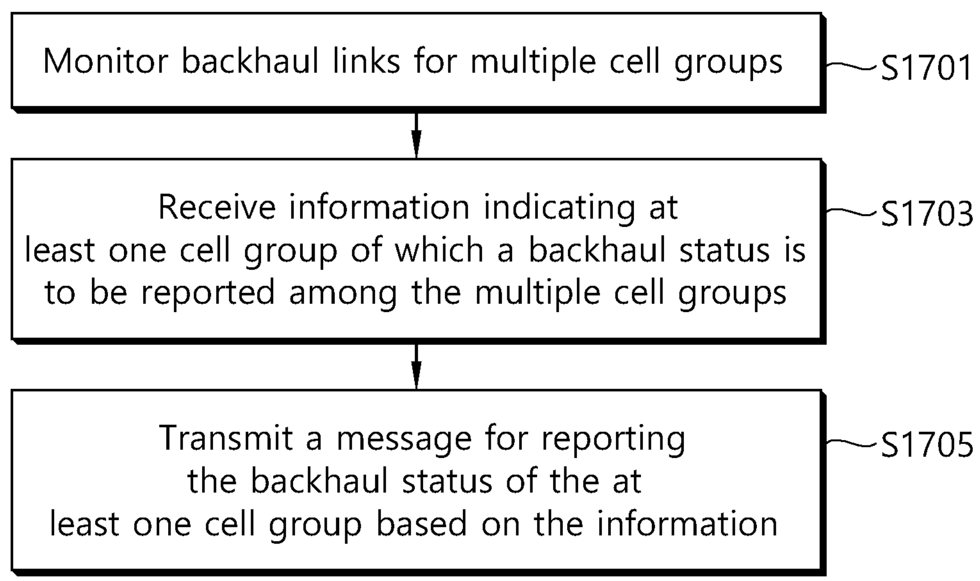
FIG. 17 shows an example of a method for reporting a failure of a cell group according to an embodiment of the present disclosure.

FIG. 17 shows an example of a method for reporting a failure of a cell group according to an embodiment of the present disclosure. Steps illustrated in FIG. 17 may be performed by a network node, IAB node and/or a wireless device.

Referring to FIG. 17, in step S1701, the network node may monitor backhaul links for multiple cell groups. For example, the network node may monitor backhaul links each of which is associated with each of the multiple cell groups.

In step S1703, the network node may receive information indicating at least one cell group of which a backhaul status is to be reported among the multiple cell groups. The backhaul status of the at least one cell group may be or may correspond to a status of the backhaul link associated with the at least one cell group.

In step S1705, the network node may transmit a message for reporting the backhaul status of the at least one cell group based on the information For example, the network node may transmit a message for reporting the backhaul status of the at last one cell group indicated by the information.

According to various embodiments, the network cell groups may comprise different cell groups. Each of the different cell groups may be related to a corresponding backhaul link.

According to various embodiments, the information may indicate a condition for reporting the backhaul status of the at least one cell group.

According to various embodiments, the backhaul status of the at least one cell group may comprise at least one of: a backhaul link failure for the at least one cell group (i.e., a failure of a backhaul link associated with the at least one cell group); a success of a recovery from the backhaul link failure; or a failure of a recovery from the backhaul link failure.

According to various embodiments, the condition may comprise a condition that the backhaul status of the at least one cell group corresponds to a specific backhaul status indicated by the information (i.e., the specific backhaul status indicated by the information is detected).

According to various embodiments, the condition may comprise a condition that the backhaul status of the at least one cell group changes.

According to various embodiments, the backhaul status of the at least one cell group may comprise a failure of a backhaul link associated with the at least one cell group. The condition may comprise a condition that a quality of service (QoS) parameter on a radio bearer related to the backhaul link is more than or equal to a threshold value indicated by the information.

According to various embodiments, the backhaul status of the at last one cell group may comprise a failure of a backhaul link associated with the at least one cell group. The condition may comprise a condition that a cause of the failure of the backhaul link corresponds to a cause of a backhaul link failure indicated by the information.

According to various embodiments, the cause of the backhaul link failure indicated by the information may comprise at least one of: a physical layer problem on the backhaul link; a random access problem on the backhaul link; or a radio link control (RLC) transmission problem on the backhaul link.

According to various embodiments, the indication may comprise an index of the at least one cell group of which a failure is to be reported.

According to various embodiments, the multiple cell groups may comprise a first cell group and a second cell group. The indication may indicate the first cell group of which a failure is to be reported. The network node may transmit the message for reporting a failure of the first cell group upon detecting the failure of the first cell group. If an indication indicating the second cell group of which a failure is to be reported is not received by the network node, the network node may not transmit a message for reporting a failure of the second cell group upon detecting the failure of the second cell group.

According to various embodiments, one of the first cell group and the second cell group may be a master cell group (MCG), and the other one of the first cell group and the second cell group may be a secondary cell group (SCG).

According to various embodiments, the network node may be configured with at least one cell group. The network node may be configured with at least one condition related to a transmission of a backhaul status report message. The network node may detect a failure of a cell group. The network node may send the backhaul status report message based on the at least one condition.

Figure 18:
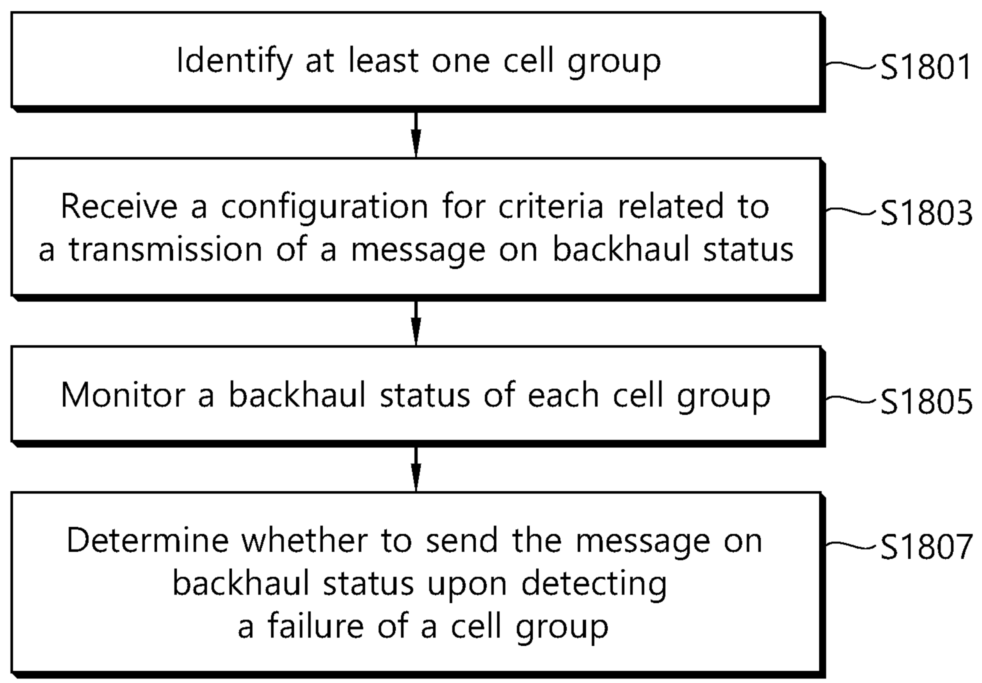
FIG. 18 shows an example of a method for backhaul status reporting on a cell group according to an embodiment of the present disclosure.

FIG. 18 shows an example of a method for backhaul status reporting on a cell group according to an embodiment of the present disclosure. Steps illustrated in FIG. 18 may be performed by a network node, IAB node and/or a wireless device.

Referring to FIG. 18, in step S1801, the network node may identify at least one cell group. The network node may be configured with the at least one cell group. Each cell group may include at least one cell. The cell group may be a MCG, SCG, or other kind of cell group.

In step S1803, the network node may receive a configuration for criteria related to a transmission of a message on backhaul status (or, backhaul status report message). The network node may be configured with criteria related to a transmission of a message on backhaul status.

The backhaul status report message may indicate the status of a backhaul link for the network node, and the status of the backhaul link (or, backhaul status) may comprise at least one of a failure of a backhaul link, a success of a recovery from a backhaul link failure, or a failure of a recovery from the backhaul link failure.

The criteria may comprise i) an indication indicating a cell group of which a failure is required to be reported (i.e., cell group indication for failure notification), and/or ii) QoS related parameters, iii) at least one failure cause.

1. Cell Group Indication for Failure Notification

For at least one cell group, backhaul status reporting may be configured. That is, for at least one cell group, whether the failure of the cell group needs to trigger sending of the backhaul status report message may be configured. For example, a donor node may configure the backhaul status reporting to the network node.

RRC message may be used for configuring the backhaul status reporting. An indication can be configured for the cell group to indicate whether the failure of the cell group needs to trigger sending the backhaul status report message or not.

The configuration may indicate one or more cell group index for cell group the failure triggers sending the backhaul status report message.

For example, the network node may be configured to trigger sending the backhaul status report message only if the network node detects a MCG failure.

For another example, the network node may be configured to trigger sending the backhaul status report message only if the network node detects an SCG failure.

For another example, the network node may be configured to trigger sending the backhaul status report message if the network node detects a failure of any cell group.

For another example, the network node may be configured to trigger sending the backhaul status report message if the network node detects a failure of at least one particular cell group.

For another example, the network node may be configured to trigger sending the backhaul status report message if MCG failure reporting to SCG is not supported by the network node.

2. QoS Related Parameters

QoS related parameters can be configured such that the network node sends the backhaul status report message if the failed backhaul link contains the radio bearer/logical channel carrying data for which the required QoS is equal to or more stringent than the configured QoS related parameters.

For example, logical channel priority threshold can be configured as a QoS related parameter such that the network node sends the backhaul status report message if the failed backhaul link contains the radio bearer/logical channel whose priority is equal to or higher than the logical channel priority threshold. The lower priority value may indicate higher priority. However, the higher priority value may indicate higher priority.

Guaranteed bit rate threshold can be configured as a QoS related parameter such that the network node sends the backhaul status report message if the failed backhaul link contains the radio bearer for which guaranteed bit rate is equal to or higher than the guaranteed bit rate threshold.

The existence of guaranteed bit rate may be used as criterion such that the network node sends the backhaul status report message if the failed backhaul contains the radio bearer for which guaranteed bit rate is required.

Buffer status threshold of RLC channel can be configured such that the network node sends the backhaul status report message if total data size available in the buffer is equal to or larger than the buffer status threshold of RLC channel.

3. Failure Cause

At least one failure cause to allow sending the backhaul status report message upon detecting a failure of the concerned cell group may be configured. If at least one cause is configured, the network node may trigger sending the backhaul status report message only if the backhaul link failure occurs due to the configured cause. The causes can be configured by a network (e.g., donor node) or the causes can be pre-defined.

For example, RLF cause can be configured as a cause to trigger sending the backhaul status report message. The RLF cause may comprise RLF cause 1 to 3 as described below.

RLF cause 1: physical layer problem, detected by no recovery for a defined duration since K consecutive out-of-sync indications from a physical layer are received. Recovery may be detected if L consecutive in-sync indications from physical layers are received.

RLF cause 2: Random access problem, detected when the configured/defined number of random access preamble (re) transmissions is reached.

RLF cause 3: RLC transmission problem, detected when the configured/defined number of retransmissions in RLC entity is reached.

The at least one failure cause may further comprise at least one of a reconfiguration failure cause, MCG reconfiguration with sync cause, inter-RAT mobility failure from NR cause, or integrity protection failure cause.

In step S1805, the network node may monitor a backhaul status of each cell group. For example, the network node may monitor whether a failure occurs for each cell group.

In step S1807, the network node may determine whether to send the backhaul status report message upon detecting a failure of a cell group. If a failure of a cell group is configured to trigger sending the backhaul status report message and no failure cause is configured/defined, the network node may send the backhaul status report message regardless of the failure cause upon detecting a failure of the cell group. If a failure of a cell group is configured to trigger sending the backhaul status report message and at least one failure cause is configured/defined, upon detecting a failure of the cell group, the network node may send the backhaul status report message only if the cause of the failure corresponds to the configured failure cause. If a cell group is not configured to trigger sending the backhaul status report message when a failure of the cell group occurs, the network node may not send the backhaul status report message even though the network node detected a failure of the cell group.

Figure 19:
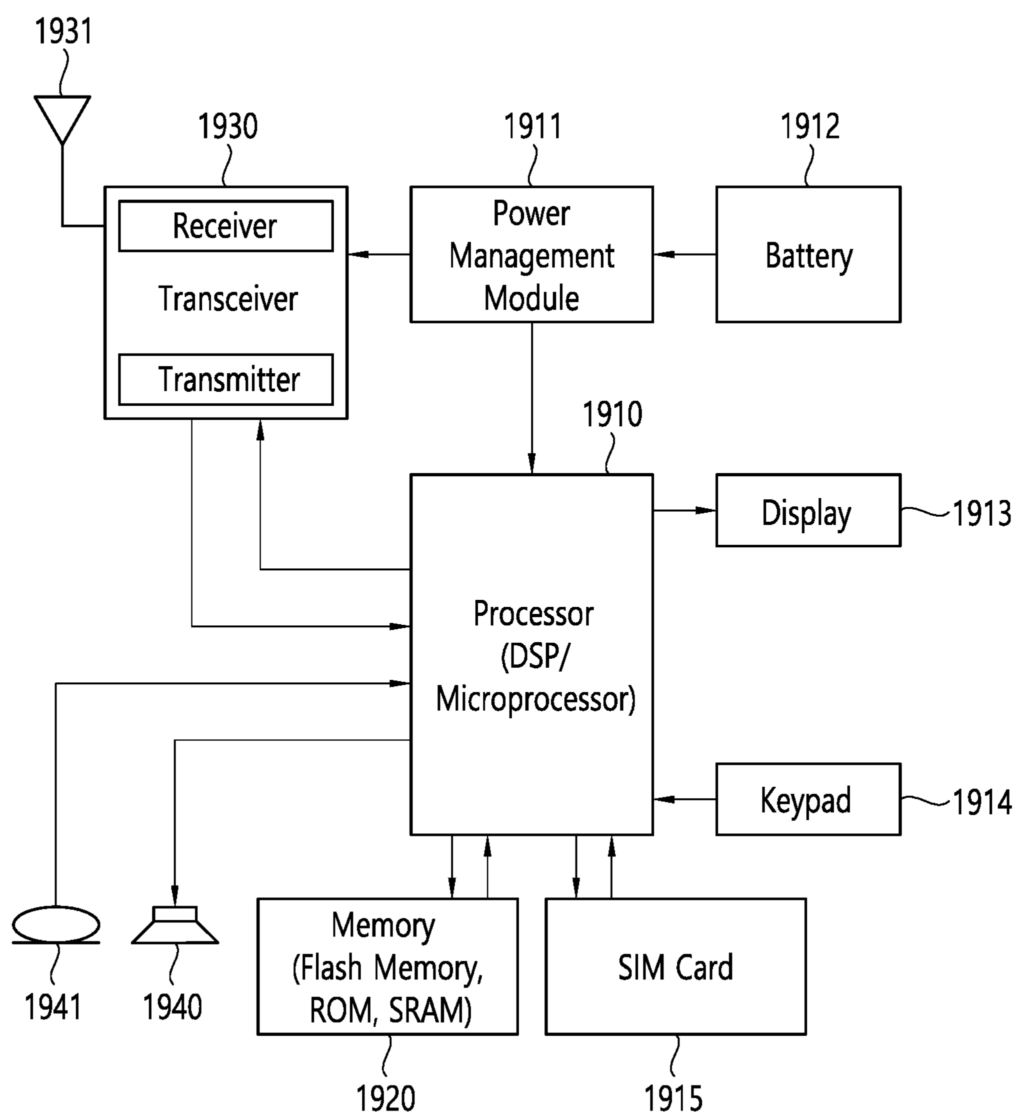
FIG. 19 shows a UE to implement an embodiment of the present disclosure.

FIG. 19 shows a UE to implement an embodiment of the present disclosure. The present disclosure described above for UE side may be applied to this embodiment.

A UE includes a processor 1910, a power management module 1911, a battery 1912, a display 1913, a keypad 1914, a subscriber identification module (SIM) card 1915, a memory 1920, a transceiver 1930, one or more antennas 1931, a speaker 1940, and a microphone 1941.

The processor 1910 may be configured to implement proposed functions, procedures and/or methods described in this description. Layers of the radio interface protocol may be implemented in the processor 1910. The processor 1910 may include application-specific integrated circuit (ASIC), other chipset, logic circuit and/or data processing device. The processor 1910 may be an application processor (AP). The processor 1910 may include at least one of a digital signal processor (DSP), a central processing unit (CPU), a graphics processing unit (GPU), a modem (modulator and demodulator). An example of the processor 1910 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1910 may be configured to, or configured to control the transceiver 1930 to implement steps performed by the UE and/or the wireless device throughout the disclosure.

The power management module 1911 manages power for the processor 1910 and/or the transceiver 1930. The battery 1912 supplies power to the power management module 1911. The display 1913 outputs results processed by the processor 1910. The keypad 1914 receives inputs to be used by the processor 1910. The keypad 1914 may be shown on the display 1913. The SIM card 1915 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1920 is operatively coupled with the processor 1910 and stores a variety of information to operate the processor 1910. The memory 1920 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1920 and executed by the processor 1910. The memory 1920 can be implemented within the processor 1910 or external to the processor 1910 in which case those can be communicatively coupled to the processor 1910 via various means as is known in the art.

The transceiver 1930 is operatively coupled with the processor 1910, and transmits and/or receives a radio signal. The transceiver 1930 includes a transmitter and a receiver. The transceiver 1930 may include baseband circuitry to process radio frequency signals. The transceiver 1930 controls the one or more antennas 1931 to transmit and/or receive a radio signal.

The speaker 1940 outputs sound-related results processed by the processor 1910. The microphone 1941 receives sound-related inputs to be used by the processor 1910.

Figure 20:
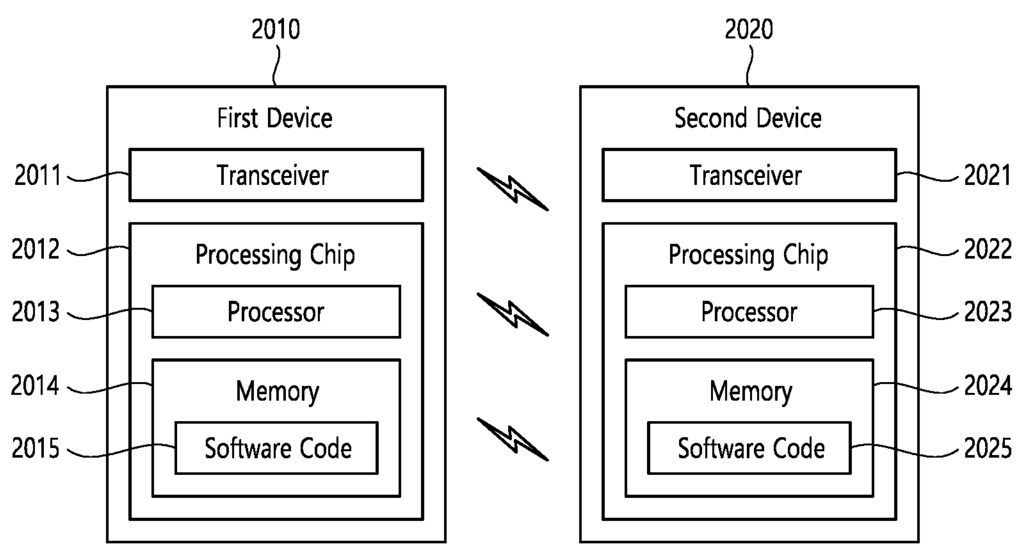
FIG. 20 shows another example of a wireless communication system to which the technical features of the present disclosure can be applied.

FIG. 20 shows another example of a wireless communication system to which the technical features of the present disclosure can be applied.

Referring to FIG. 20, the wireless communication system may include a first device 2010 (i.e., first device 210) and a second device 2020 (i.e., second device 220).

The first device 2010 may include at least one transceiver, such as a transceiver 2011, and at least one processing chip, such as a processing chip 2012. The processing chip 2012 may include at least one processor, such a processor 2013, and at least one memory, such as a memory 2014. The memory may be operably connectable to the processor 2013. The memory 2014 may store various types of information and/or instructions. The memory 2014 may store a software code 2015 which implements instructions that, when executed by the processor 2013, perform operations of the first device 910 described throughout the disclosure. For example, the software code 2015 may implement instructions that, when executed by the processor 2013, perform the functions, procedures, and/or methods of the first device 2010 described throughout the disclosure. For example, the software code 2015 may control the processor 2013 to perform one or more protocols. For example, the software code 2015 may control the processor 2013 to perform one or more layers of the radio interface protocol.

The second device 2020 may include at least one transceiver, such as a transceiver 2021, and at least one processing chip, such as a processing chip 2022. The processing chip 2022 may include at least one processor, such a processor 2023, and at least one memory, such as a memory 2024. The memory may be operably connectable to the processor 2023. The memory 2024 may store various types of information and/or instructions. The memory 2024 may store a software code 2025 which implements instructions that, when executed by the processor 2023, perform operations of the second device 2020 described throughout the disclosure. For example, the software code 2025 may implement instructions that, when executed by the processor 2023, perform the functions, procedures, and/or methods of the second device 2020 described throughout the disclosure. For example, the software code 2025 may control the processor 2023 to perform one or more protocols. For example, the software code 2025 may control the processor 2023 to perform one or more layers of the radio interface protocol.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 21:
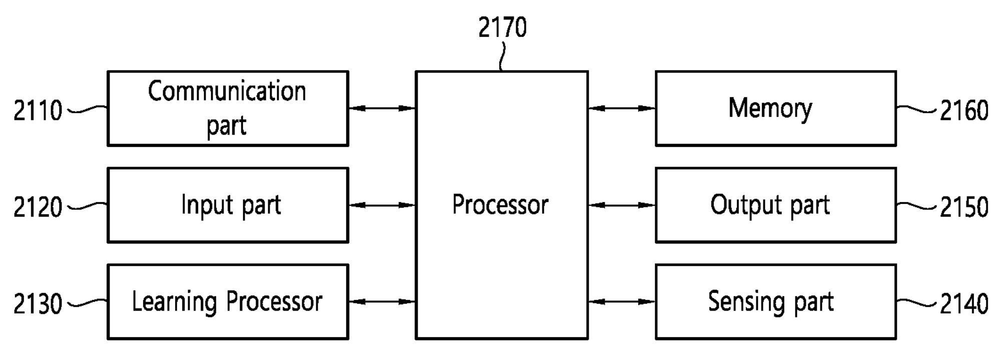
FIG. 21 shows an example of an AI device to which the technical features of the present disclosure can be applied.

FIG. 21 shows an example of an AI device to which the technical features of the present disclosure can be applied.

The AI device 2100 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 21, the AI device 2100 may include a communication part 2110, an input part 2120, a learning processor 2130, a sensing part 2140, an output part 2150, a memory 2160, and a processor 2170.

The communication part 2110 can transmit and/or receive data to and/or from external devices such as the AI devices and the AI server using wire and/or wireless communication technology. For example, the communication part 2110 can transmit and/or receive sensor information, a user input, a learning model, and a control signal with external devices. The communication technology used by the communication part 2110 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 2120 can acquire various kinds of data. The input part 2120 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 2120 can acquire input data to be used when acquiring an output using learning data and a learning model for model learning. The input part 2120 may obtain raw input data, in which case the processor 2170 or the learning processor 2130 may extract input features by preprocessing the input data.

The learning processor 2130 may learn a model composed of an ANN using learning data. The learned ANN can be referred to as a learning model. The learning model can be used to infer result values for new input data rather than learning data, and the inferred values can be used as a basis for determining which actions to perform. The learning processor 2130 may perform AI processing together with the learning processor of the AI server. The learning processor 2130 may include a memory integrated and/or implemented in the AI device 2100. Alternatively, the learning processor 2130 may be implemented using the memory 2160, an external memory directly coupled to the AI device 2100, and/or a memory maintained in an external device.

The sensing part 2140 may acquire at least one of internal information of the AI device 2100, environment information of the AI device 2100, and/or the user information using various sensors. The sensors included in the sensing part 2140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 2150 may generate an output related to visual, auditory, tactile, etc. The output part 2150 may include a display unit for outputting visual information, a speaker for outputting auditory information, and/or a haptic module for outputting tactile information.

The memory 2160 may store data that supports various functions of the AI device 2100. For example, the memory 2160 may store input data acquired by the input part 2120, learning data, a learning model, a learning history, etc.

The processor 2170 may determine at least one executable operation of the AI device 2100 based on information determined and/or generated using a data analysis algorithm and/or a machine learning algorithm. The processor 2170 may then control the components of the AI device 2100 to perform the determined operation. The processor 2170 may request, retrieve, receive, and/or utilize data in the learning processor 2130 and/or the memory 2160, and may control the components of the AI device 2100 to execute the predicted operation and/or the operation determined to be desirable among the at least one executable operation. The processor 2170 may generate a control signal for controlling the external device, and may transmit the generated control signal to the external device, when the external device needs to be linked to perform the determined operation. The processor 2170 may obtain the intention information for the user input and determine the user's requirements based on the obtained intention information. The processor 2170 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 2130 and/or learned by the learning processor of the AI server, and/or learned by their distributed processing. The processor 2170 may collect history information including the operation contents of the AI device 2100 and/or the user's feedback on the operation, etc. The processor 2170 may store the collected history information in the memory 2160 and/or the learning processor 2130, and/or transmit to an external device such as the AI server. The collected history information can be used to update the learning model. The processor 2170 may control at least some of the components of AI device 2100 to drive an application program stored in memory 2160. Furthermore, the processor 2170 may operate two or more of the components included in the AI device 2100 in combination with each other for driving the application program.

Figure 22:
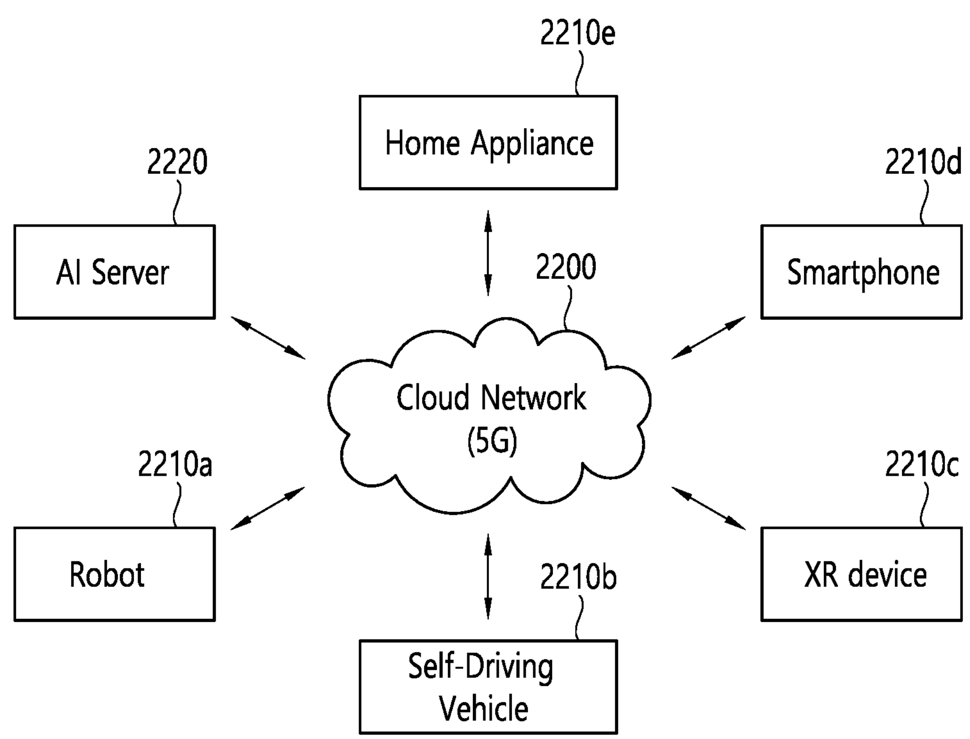
FIG. 22 shows an example of an AI system to which the technical features of the present disclosure can be applied.

FIG. 22 shows an example of an AI system to which the technical features of the present disclosure can be applied.

Referring to FIG. 22, in the AI system, at least one of an AI server 2220, a robot 2210*a*, an autonomous vehicle 2210*b*, an XR device 2210*c*, a smartphone 2210*d* and/or a home appliance 2210*e* is connected to a cloud network 2200. The robot 2210*a*, the autonomous vehicle 2210*b*, the XR device 2210*c*, the smartphone 2210*d*, and/or the home appliance 2210*e* to which the AI technology is applied may be referred to as AI devices 2210*a* to 2210*e*.

The cloud network 2200 may refer to a network that forms part of a cloud computing infrastructure and/or resides in a cloud computing infrastructure. The cloud network 2200 may be configured using a 3G network, a 4G or LTE network, and/or a 5G network. That is, each of the devices 2210*a* to 2210*e* and 2220 consisting the AI system may be connected to each other through the cloud network 2200. In particular, each of the devices 2210*a* to 2210*e* and 2220 may communicate with each other through a base station, but may directly communicate with each other without using a base station.

The AI server 2220 may include a server for performing AI processing and a server for performing operations on big data. The AI server 2220 is connected to at least one or more of AI devices constituting the AI system, i.e. the robot 2210*a*, the autonomous vehicle 2210*b*, the XR device 2210*c*, the smartphone 2210*d* and/or the home appliance 2210*e* through the cloud network 2200, and may assist at least some AI processing of the connected AI devices 2210*a* to 2210*e*. The AI server 2220 can learn the ANN according to the machine learning algorithm on behalf of the AI devices 2210*a* to 2210*e*, and can directly store the learning models and/or transmit them to the AI devices 2210*a* to 2210*e*. The AI server 2220 may receive the input data from the AI devices 2210*a* to 2210*e*, infer the result value with respect to the received input data using the learning model, generate a response and/or a control command based on the inferred result value, and transmit the generated data to the AI devices 2210*a* to 2210*e*. Alternatively, the AI devices 2210*a* to 2210*e* may directly infer a result value for the input data using a learning model, and generate a response and/or a control command based on the inferred result value.

Various embodiments of the AI devices 2210*a* to 2210*e* to which the technical features of the present disclosure can be applied will be described. The AI devices 2210*a* to 2210*e* shown in FIG. 22 can be seen as specific embodiments of the AI device 2100 shown in FIG. 21.

The present disclosure can have various advantageous effects.

For example, various embodiments of the present disclosure provide solution to allow a fine control on backhaul link status notification of each node.

For example, the failure notification can be controlled based on cell group being failed, the cause of the failure, and/or the failure recovery capability. Through this control capability, the stability of IAB node can be increased since unnecessarily backhaul link status notification can be avoided.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a network node in a wireless communication system, the method comprising:

monitoring backhaul links for multiple cell groups comprising a first cell group and a second cell group;

receiving information indicating the first cell group of which a failure is to be reported; and transmitting a message for reporting a failure of the first cell group upon detecting the failure of the first cell group, wherein an indication indicating the second cell group of which a failure is to be reported is not received by the network node, wherein a message for reporting a failure of the second cell group is not transmitted by the network node upon detecting the failure of the second cell group, wherein the network node comprises an integrated access and backhaul (IAB) node, wherein the IAB node communicates with one or more other IAB nodes via a wireless backhaul link, wherein the one or more other IAB nodes comprise at least one of a parent node for the IAB node or a child node for the IAB node, wherein the parent node is a next hop neighbor node with respect to an IAB-mobile termination (IAB-MT) of the IAB node, wherein the child node is a next hop neighbor node with respect to an IAB-distributed unit (IAB-DU) of the IAB node, and wherein protocol layers used by the IAB node comprise at least one of:

a physical layer;

a media access control (MAC) layer;

a radio link control (RLC) layer;

a backhaul adaptation protocol (BAP) layer;

a packet data convergence protocol (PDCP) layer;

a radio resource control (RRC) layer; or a non-access stratum (NAS) layer.

2. The method of claim 1, wherein each of the multiple cell groups is related to a corresponding backhaul link.

3. The method of claim 1, wherein the information further indicates a condition for reporting a backhaul status of the first cell group.

4. The method of claim 3, wherein the backhaul status of the first cell group comprises at least one of:

a backhaul link failure for the first cell group;

a success of a recovery from the backhaul link failure; or a failure of a recovery from the backhaul link failure.

5. The method of claim 3, wherein the condition is that the backhaul status of the first cell group corresponds to a specific backhaul status indicated by the information.

6. The method of claim 3, wherein the condition is that the backhaul status of the first cell group changes.

7. The method of claim 3, wherein the backhaul status of the first cell group comprises a failure of a backhaul link associated with the first cell group, and wherein the condition is that a quality of service (QoS) parameter on a radio bearer related to the backhaul link is more than or equal to a threshold value indicated by the information.

8. The method of claim 3, wherein the backhaul status of the first cell group comprises a failure of a backhaul link associated with the first cell group, and wherein the condition is that a cause of the failure of the backhaul link corresponds to a cause of a backhaul link failure indicated by the information.

9. The method of claim 8, wherein the cause of the backhaul link failure indicated by the information comprises at least one of:

a physical layer problem on the backhaul link;

a random access problem on the backhaul link; or an RLC transmission problem on the backhaul link.

10. The method of claim 1, wherein the indication comprises an index of the first cell group of which a failure is to be reported.

11. The method of claim 1, wherein one of the first cell group and the second cell group is a master cell group (MCG), and the other one of the first cell group and the second cell group is a secondary cell group (SCG).

12. The method of claim 1, further comprising:

communicating with a wireless device that is in communication with at least one of a user equipment, a network, or autonomous vehicles other than the wireless device.

13. A network node in a wireless communication system comprising:

a transceiver;

a memory; and at least one processor operatively coupled to the transceiver and the memory, wherein the memory stores instructions that, based on being executed by the at least one processor, perform operations comprising:

monitoring backhaul links for multiple cell groups comprising a first cell group and a second cell group;

receiving information indicating the first cell group of which a failure is to be reported; and transmitting a message for reporting a failure of the first cell group upon detecting the failure of the first cell group, wherein an indication indicating the second cell group of which a failure is to be reported is not received by the network node, wherein a message for reporting a failure of the second cell group is not transmitted by the network node upon detecting the failure of the second cell group, wherein the network node comprises an integrated access and backhaul (IAB) node, wherein the IAB node communicates with one or more other IAB nodes via a wireless backhaul link, wherein the one or more other IAB nodes comprise at least one of a parent node for the IAB node or a child node for the IAB node, wherein the parent node is a next hop neighbor node with respect to an IAB-mobile termination (IAB-MT) of the IAB node, wherein the child node is a next hop neighbor node with respect to an IAB-distributed unit (IAB-DU) of the IAB node, and wherein protocol layers used by the IAB node comprise at least one of:

a physical layer;

a media access control (MAC) layer;

a radio link control (RLC) layer;

a backhaul adaptation protocol (BAP) layer;

a packet data convergence protocol (PDCP) layer;

a radio resource control (RRC) layer; or a non-access stratum (NAS) layer.

14. A processor for a network node in a wireless communication system, wherein the processor is configured to control the network node to perform operations comprising:

monitoring backhaul links for multiple cell groups comprising a first cell group and a second cell group;

receiving information indicating the first cell group of which a failure is to be reported; and transmitting a message for reporting a failure of the first cell group upon detecting the failure of the first cell group, wherein an indication indicating the second cell group of which a failure is to be reported is not received by the network node, wherein a message for reporting a failure of the second cell group is not transmitted by the network node upon detecting the failure of the second cell group, wherein the network node comprises an integrated access and backhaul (IAB) node, wherein the IAB node communicates with one or more other IAB nodes via a wireless backhaul link, wherein the one or more other IAB nodes comprise at least one of a parent node for the IAB node or a child node for the IAB node, wherein the parent node is a next hop neighbor node with respect to an IAB-mobile termination (IAB-MT) of the IAB node, wherein the child node is a next hop neighbor node with respect to an IAB-distributed unit (IAB-DU) of the IAB node, and wherein protocol layers used by the IAB node comprise at least one of:

a physical layer;

a media access control (MAC) layer;

a radio link control (RLC) layer;

a backhaul adaptation protocol (BAP) layer;

a packet data convergence protocol (PDCP) layer;

a radio resource control (RRC) layer; or a non-access stratum (NAS) layer.

* * * * *